United States Patent
Jaaskelainen et al.

(10) Patent No.: US 11,396,808 B2
(45) Date of Patent: Jul. 26, 2022

(54) WELL INTERFERENCE SENSING AND FRACTURING TREATMENT OPTIMIZATION

(71) Applicant: Halliburton Energy Services, Inc., Houston, TX (US)

(72) Inventors: Mikko Jaaskelainen, Katy, TX (US); Harold Grayson Walters, Tomball, TX (US); Crispin Doyle, Swindon (GB)

(73) Assignee: Halliburton Energy Services, Inc., Houston, TX (US)

( * ) Notice: Subject to any disclaimer, the term of this patent is extended or adjusted under 35 U.S.C. 154(b) by 288 days.

(21) Appl. No.: 16/724,581

(22) Filed: Dec. 23, 2019

(65) Prior Publication Data

US 2021/0189874 A1 Jun. 24, 2021

(51) Int. Cl.
*E21B 43/26* (2006.01)
*E21B 47/135* (2012.01)
(Continued)

(52) U.S. Cl.
CPC .......... *E21B 49/00* (2013.01); *E21B 41/0092* (2013.01); *E21B 43/26* (2013.01);
(Continued)

(58) Field of Classification Search
CPC ... G01V 3/18; G01V 1/40; G01V 1/42; E21B 47/114; E21B 47/135; E21B 43/26; E21B 43/30; E21B 43/305
See application file for complete search history.

(56) References Cited

U.S. PATENT DOCUMENTS

| 8,498,852 B2 | 7/2013 | Xu et al. |
| 8,950,482 B2 | 2/2015 | Hill et al. |

(Continued)

FOREIGN PATENT DOCUMENTS

| WO | 2015/031519 A1 | 3/2015 |
| WO | 2019097213 A1 | 5/2019 |

OTHER PUBLICATIONS

International Search Report and Written Opinion issued in related PCT Application No. PCT/US2019/068524 dated Sep. 21, 2020, 12 pages.

*Primary Examiner* — Kenneth L Thompson
(74) *Attorney, Agent, or Firm* — Kilpatrick Townsend & Stockton LLP

(57) ABSTRACT

A fracturing treatment optimization system using multipoint pressure sensitive fiber optic cables to measure interwell fluid interaction data, microdeformation strain data, microseismic data, distributed temperature data, distributed acoustic data, and distributed strain data from multiple locations along a wellbore. The fracturing treatment optimization system may analyze the interwell fluid interaction data, microdeformation strain data, microseismic data, distributed temperature data, distributed acoustic data, and distributed strain data, modify a subsurface fracture network model, and calculate interwell fluid interaction effects. The fracturing treatment optimization system may use the fracture network model to measure current and predict future fracture growth, hydraulic pressure, poroelastic pressure, strain, stress, and related completion effects. The fracturing treatment optimization system may enable real-time monitoring and analysis of treatment and monitoring wells. The fracturing treatment optimization system may suggest and effect modifications to optimize treatment of the treatment and monitoring wells.

20 Claims, 12 Drawing Sheets

(51) Int. Cl.
*E21B 49/00* (2006.01)
*G01V 1/22* (2006.01)
*G01V 1/28* (2006.01)
*E21B 41/00* (2006.01)
*E21B 47/07* (2012.01)
*G01V 1/42* (2006.01)

(52) U.S. Cl.
CPC ............ *E21B 47/07* (2020.05); *G01V 1/226* (2013.01); *G01V 1/288* (2013.01); *G01V 1/42* (2013.01)

(56) References Cited

U.S. PATENT DOCUMENTS

| | | |
|---|---|---|
| 9,988,895 B2 | 6/2018 | Roussel et al. |
| 10,436,027 B2* | 10/2019 | Kampfer ................. E21B 43/26 |
| 10,458,207 B1* | 10/2019 | Matringe ................. E21B 47/11 |
| 11,028,679 B1* | 6/2021 | Haustveit ............... E21B 44/005 |
| 2003/0050758 A1 | 3/2003 | Soliman et al. |
| 2004/0045705 A1 | 3/2004 | Gardner et al. |
| 2011/0229071 A1* | 9/2011 | Vincelette ............ E21B 47/135 |
| | | 385/13 |
| 2014/0372094 A1 | 12/2014 | Holland et al. |
| 2016/0010443 A1 | 1/2016 | Xu |
| 2016/0326859 A1* | 11/2016 | Crews ................. E21B 41/0035 |
| 2017/0123089 A1* | 5/2017 | Walters .................... G01V 1/42 |
| 2018/0355707 A1* | 12/2018 | Rodriguez Herrera .. G01V 1/50 |
| 2019/0301276 A1* | 10/2019 | Jin ........................ E21B 47/107 |

* cited by examiner

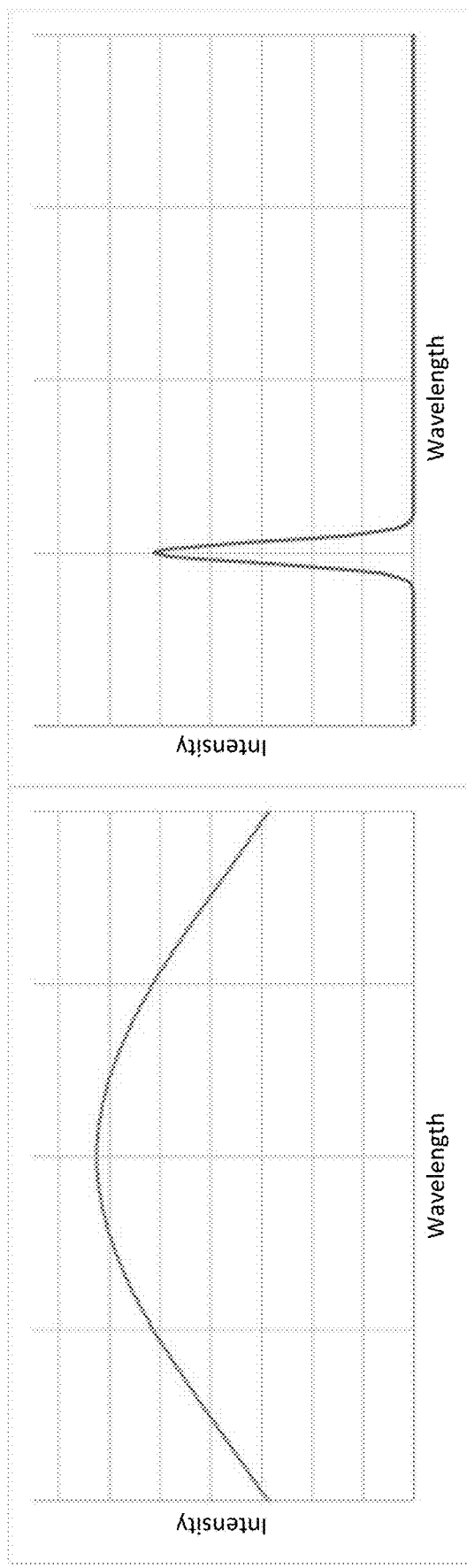
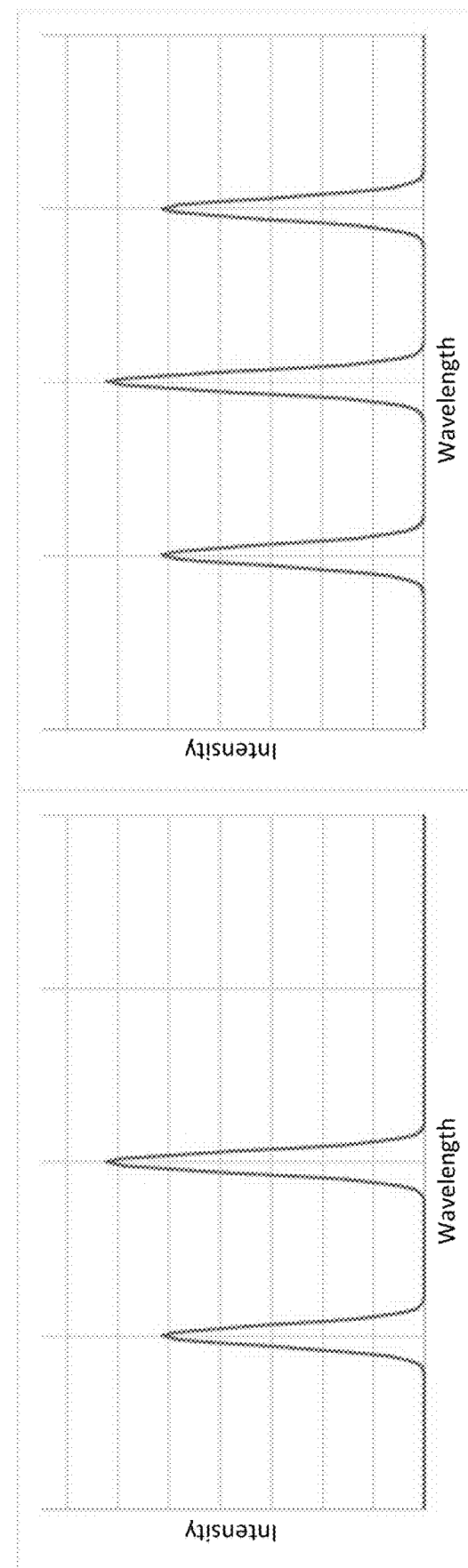
FIGURE 3A
FIGURE 3B
FIGURE 3C
FIGURE 3D

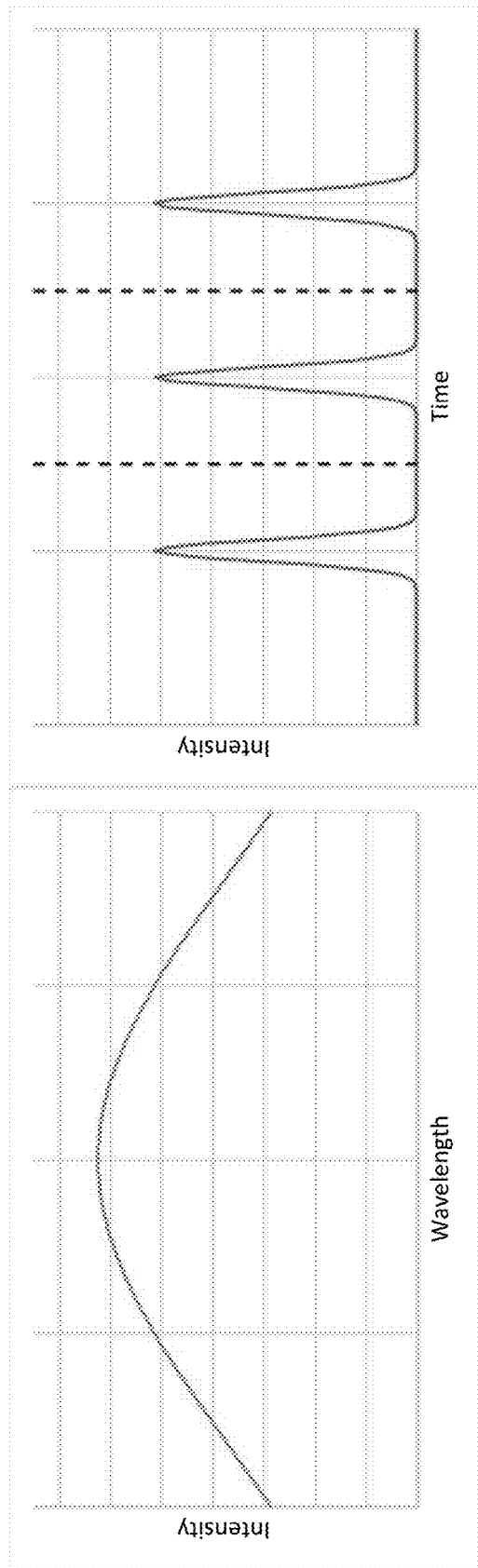

WELL INTERFERENCE SENSING AND FRACTURING TREATMENT OPTIMIZATION

TECHNICAL FIELD

The present disclosure relates to a fracturing treatment optimization system and, more particularly, to a fracturing treatment optimization system comprising well interference sensing using multi-point pressure sensitive fiber optic cables to measure one or more of interwell fluid interaction data, microdeformation strain data, microseismic data, distributed temperature data, distributed acoustic data, and distributed strain data from multiple locations along a wellbore, analyze the interwell fluid interaction data, microdeformation strain data, microseismic data, distributed temperature data, distributed acoustic data, and distributed strain data, modify a subsurface fracture network model, calculate one or more interwell fluid interaction effects, measure and predict future fracture growth, hydraulic pressure, poroelastic pressure, strain, stress, and related completion effects, enable real-time and automated monitoring and analysis of treatment and monitoring wells, and suggest and effect modifications to optimize treatment of the treatment and monitoring wells.

BACKGROUND

Well interference is a major challenge in the oil and gas industry with few, if any, practical real-time sensing and mitigation solutions. Oil and gas operations may involve drilling wells to produce oil and gas. In some cases, this may involve drilling two wells: a treatment well (also called a production well), and a monitoring well. One or more sensors may be installed within or near the monitoring well to capture data, such as pressure data, that may be used to analyze treatment of one or both of the treatment well and the monitoring well.

In existing subsurface sensing technologies, the location of sensors may limit the amount of information provided by these sensing technologies. Further, deploying multiple sensors does not ensure each sensor is capable of independently reporting subsurface measurements. For example, a simple pressure measurement may not accurately differentiate between multiple fracture locations and may be insufficient to identify the location of formation events along the wellbore. Likewise, pressure measurements inside the casing may not spatially differentiate between fracture locations and formation events along the wellbore. Pressure communication from the reservoir into the wellbore may require a treated well with perforations whereas a monitoring well prior to a fracture treatment may have limited pressure communication with the formation given the lack of perforations.

Existing pressure sensing technologies using a fiber optic cable to detect subsurface pressure changes may require isolating the monitoring well to measure pressure. For example, the monitoring well may be sealed using frac plugs or sliding sleeves before measuring a response in the wellbore between the plug and the surface pressure sensor. This pressure measurement provided by the surface pressure sensor is often limited to a single value that is a combination of the subsurface pressures and does not provided sufficient information to differentiate between pressures at different locations below the surface. Additionally, in existing implementations, the effects of individual fractures may be indistinguishable as a result of approximations of the fracture network.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIGS. 3A, 3B, 3C, and 3D are illustrations of exemplary signals provided to and received from an exemplary fracturing treatment optimization configuration, according to one or more aspects of the present disclosure.

FIGS. 4A and 4B are illustrations of exemplary signals reflecting from a Fiber Bragg Grating in optical fiber, according to one or more aspects of the present disclosure.

Figure 1:
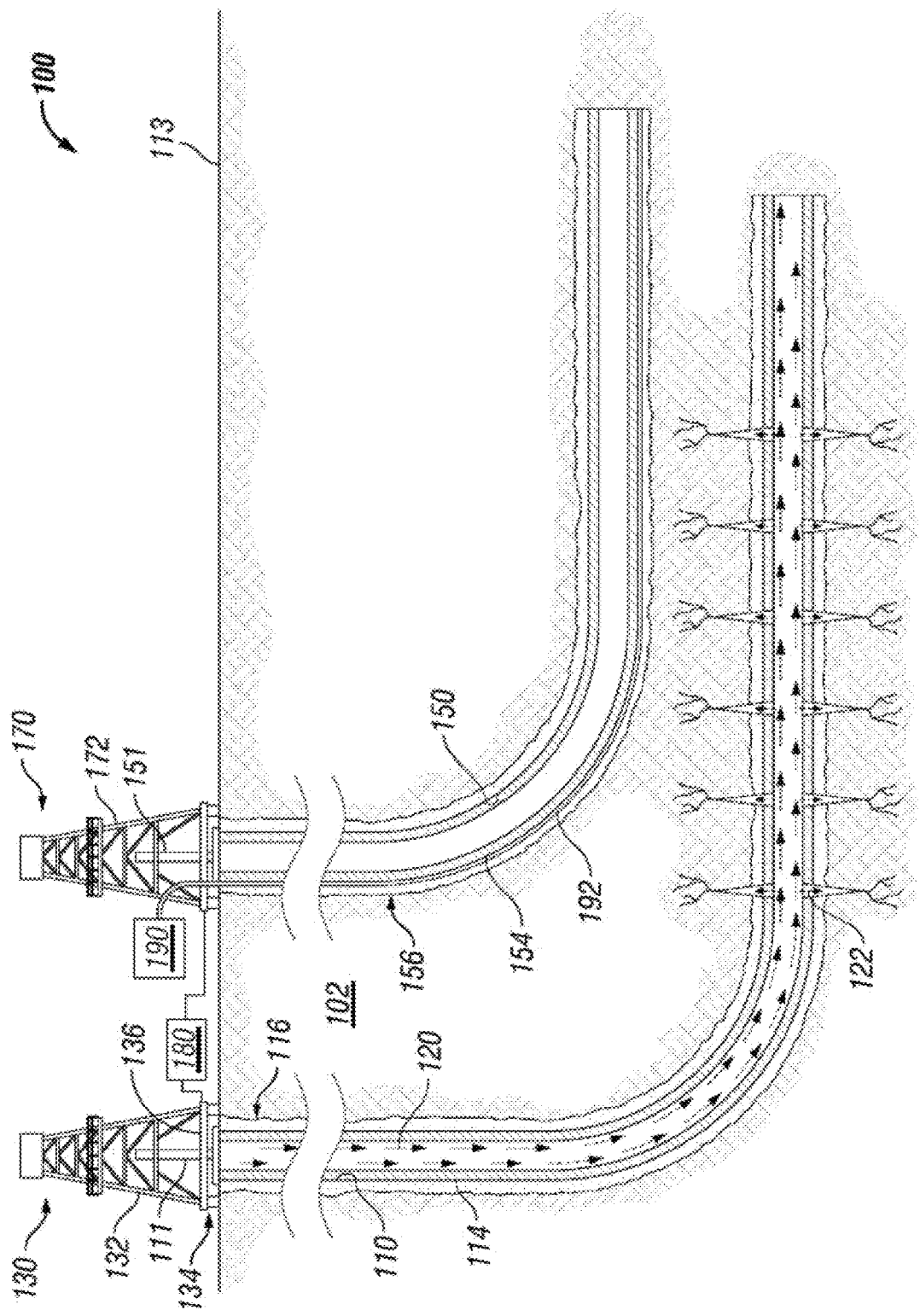
FIG. 1 is an illustration of an exemplary well interference sensing and fracturing treatment optimization configuration.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DETAILED DESCRIPTION

The present disclosure relates to a fracturing treatment optimization system and, more particularly, to a fracturing treatment optimization system comprising well interference sensing using multi-point pressure sensitive fiber optic cables to measure one or more of interwell fluid interaction data, microdeformation strain data, microseismic data, distributed temperature data, distributed acoustic data, and distributed strain data from multiple locations along a wellbore, analyze the interwell fluid interaction data, microdeformation strain data, microseismic data, distributed temperature data, distributed acoustic data, and distributed strain data, modify a subsurface fracture network model, calculate one or more interwell fluid interaction effects, measure and predict future fracture growth, hydraulic pressure, poroelastic pressure, strain, stress, and related completion effects, enable real-time and automated monitoring and analysis of treatment and monitoring wells, and suggest and effect modifications to optimize treatment of the treatment and monitoring wells.

The use of multi-point formation-related sensing enables measurement of spatially separate values. Detection of microdeformation and microseismic events using the multi-point pressure sensitive fiber optic cables may provide additional levels of certainty of subsurface conditions, including potential or existing well interference. These improved data measurements may be used with a subsurface fracture network model, which may incorporate one or more interwell fluid interaction effects, including, for example, subsurface poroelastic effects, fracture leakoff effects, reservoir fluid flow effects (also called Darcy flow), and hydraulic connection effects (which may be through one or more of induced and natural fractures). The subsurface fracture network model may model fracture growth occurring based, at least in part, on induced pressure and may use additional distributed measurements to provide improvements over existing subsurface measurement implementations that are unable to accurately map fracture growth. The present disclosure improves on existing implementations by providing a subsurface fracture network model capable of accounting for individual independent fractures. The subsurface fracture network model may calculate stress, strain, hydraulic pressure, and poroelastic pore pressure response along a wellbore within a formation based, at least in part, on these individual independent fractures. The present disclosure also improves on existing implementations by providing a richer data set with improved spatial resolution of subsurface pressure events combined with other distributed optical sensing technologies. The present disclosure also improves on existing implementations by enabling fracturing treatment optimization actions that may prevent, reduce, or both prevent and reduce the impact of frac hits, wherein the hydraulic fracture networks of one well interferes with the existing hydraulic fracture networks on a second well. Because frac hits may potentially reduce production on the second well through several mechanisms, including one or more interwell fluid interaction effects, the present disclosure improves the ability to produce from multiple wells in relatively close proximities.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of one or more embodiments are given. In no way should the following examples be read to limit or define the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

In one or more embodiments, a method for optimizing a fracturing treatment may comprise measuring one or more of interwell fluid interaction data, microdeformation strain data, microseismic data, distributed temperature data, distributed acoustic data, and distributed strain data from a subsurface formation; analyzing the one or more of interwell fluid interaction data, microdeformation strain data, microseismic data, distributed temperature data, distributed acoustic data, and distributed strain data; modifying a fracture network model based, at least in part, on the analyzing the one or more of interwell fluid interaction data, microdeformation strain data, microseismic data, distributed temperature data, distributed acoustic data, and distributed strain data; and modifying one or more fracturing treatment optimization actions based, at least in part, on the fracture network model.

In one or more embodiments, measuring the one or more of interwell fluid interaction data, microdeformation strain data, microseismic data, distributed temperature data, distributed acoustic data, and distributed strain data from the subsurface formation may comprise using one or more optical fibers. In one or more embodiments, the one or more optical fibers may comprise a fiber optic cable. In one or more embodiments, the one or more optical fibers may comprise one or more Fiber Bragg Gratings. In one or more embodiments, the method may further comprise using one or more of time-division multiplexing and wavelength-division multiplexing to collect the one or more of interwell fluid interaction data, microdeformation strain data, microseismic data, distributed temperature data, distributed acoustic data, and distributed strain data from the one or more optical fibers. In one or more embodiments, the one or more optical fibers may comprise one or more of one or more single-mode fibers and one or more multi-mode fibers.

In one or more embodiments, the method may further comprise collecting well treatment data and modifying the fracture network model based, at least in part, on the well treatment data. In one or more embodiments, the method may further comprise calculating one or more interwell fluid interaction effects and modifying the fracture network model based, at least in part, on the one or more interwell fluid interaction effects. In one or more embodiments, modifying the one or more fracturing treatment optimization actions may comprise modifying one or more parameters associated with treatment of one or more of a treatment well and a monitoring well.

In one or more embodiments, a non-transitory computer readable medium for storing one or more instructions that, when executed, may cause a processor to collect one or more of interwell fluid interaction data, microdeformation strain data, microseismic data, distributed temperature data, distributed acoustic data, and distributed strain data from one or more sensors measuring a subsurface formation; analyze the one or more of interwell fluid interaction data, microdeformation strain data, microseismic data, distributed temperature data, distributed acoustic data, and distributed strain data; calculate one or more interwell fluid interaction effects based, at least in part, on the one or more of interwell fluid interaction data, microdeformation strain data, microseismic data, distributed temperature data, distributed acoustic data, and distributed strain data; and modify one or more parameters associated with treatment of one or more of a treatment well and a monitoring well based, at least in part, on the one or more interwell fluid interaction effects.

In one or more embodiments, the one or more sensors may comprise one or more optical fibers. In one or more embodiments, the one or more optical fibers may comprise a fiber optic cable. In one or more embodiments, the one or more optical fibers comprise one or more Fiber Bragg Gratings. In one or more embodiments, the one or more instructions, when executed, may further cause the processor to modify a fracture network model based, at least in part, on the one or more interwell fluid interaction effects. In one or more embodiments, the one or more instructions, when executed, further causes the processor to collect well treatment data; and modify the one or more parameters associated with treatment of one or more of a treatment well and a monitoring well based, at least in part, on the well treatment data.

In one or more embodiments, a method for optimizing a fracturing treatment may comprise using a fiber optic cable in a subsurface formation to measure one or more of interwell fluid interaction data, microdeformation strain data, microseismic data, distributed temperature data, distributed acoustic data, and distributed strain data; analyze the one or more of interwell fluid interaction data, microdeformation strain data, microseismic data, distributed temperature data, distributed acoustic data, and distributed strain data; modify a fracture network model based, at least in part, on the analyzing the one or more of interwell fluid interaction data, microdeformation strain data, microseismic data, distributed temperature data, distributed acoustic data, and distributed strain data; and modify one or more fracturing treatment optimization actions based, at least in part, on the modified fracture network model.

In one or more embodiments, the method may further comprise using one or more of time-division multiplexing and wavelength-division multiplexing to collect the one or more of interwell fluid interaction data, microdeformation strain data, microseismic data, distributed temperature data, distributed acoustic data, and distributed strain data from the fiber optic cable. In one or more embodiments, the fiber optic cable may comprise one or more optical fibers, and wherein the one or more optical fibers comprise one or more Fiber Bragg Gratings. In one or more embodiments, the method may further comprise collecting well treatment data and modifying the fracture network model based, at least in part, on the well treatment data. In one or more embodiments, modifying the one or more fracturing treatment optimization actions based, at least in part, on the modified fracture network model may further comprises modifying one or more of parameters associated with treating one or more of a treatment well and a monitoring well.

Oil and gas production using fracturing (or fracing) may be improved by measuring subsurface conditions and analyzing these measurements. Fracturing subsurface formations enables oil and gas production from the formation that might otherwise be trapped or difficult to extract. Fracturing may include drilling a borehole into a formation, lining the borehole with casing, and cementing the casing in place. In some cases, the final borehole may be drilled perpendicular to the surface, while in other cases, the borehole may include portions that are perpendicular to the surface, a portion that is curved, and another portion that is parallel to the surface. In certain implementations, the formation may be fractured using perforation charges or shaped charges. A fluid, including, for example, water, may be injected into the formation at high pressure to create fractures that enable the oil and gas within the formation to flow back to the casing, where the oil and gas may be extracted from the formation. In certain implementations, the fluid used to create the subsurface fractures may include particulates called proppant to keep the fractures open to enable the oil and gas production process. The oil and gas production process may result in changes to subsurface pressure. Accordingly, one measurement that is of particular interest is subsurface pressure. Ideally, subsurface pressure is measured at multiple locations along the span of a wellbore. One such method for measuring subsurface pressure data is using permanently installed sensors.

Various aspects of the present disclosure may be implemented in various environments. FIG. 1 is a cross-sectional schematic diagram depicting an example environment comprising a treatment well and a monitoring well that permits the acquisition of subsurface data, including, for example, pressure data, and enables analysis of one or more subsurface properties according to one or more aspects of the present disclosure. An example wellbore environment 100 for acquiring subsurface data, according to one or more aspects of the present disclosure, is illustrated. The wellbore environment 100 may comprise a first well 130, which may be a treatment well, and a second well 170 which may be a monitoring well. The first well 130 may comprise a first wellbore 110, and a second well 170, may comprise a second wellbore 150. The first well 130 may further comprise a drilling platform 132, a wellhead installation 134, and blowout preventers 136 at a surface 113. The second well 170 may comprise a second drilling platform 172, a wellhead installation (not labeled), and blow out preventers (not labeled) at the surface 113. In one or more embodiments, a drilling platform 132 may support components for one or more of drilling, exploration, and sensing, including, for example, a drill string 111, 151 and one or more liners or casing 114, 154 that are cemented in place using cement 116, 156. The drill string 111, 151 may include one or more pipes that extend below the surface 113 in the wellbore 110. In one or more embodiments, the drill string 111, 151 may enable transmission of drilling fluid (or drilling mud) 120 to operate a drill bit positioned at the end of the drill string (not shown). The mud transmitted by the drill string may provide the torque necessary to operate the drill bit. The weight of the drill string may prove an axial force on the drill bit, that together with the rotation of the drill bit, may aid in drilling the wellbore 110 through a subsurface formation 102 in the earth. Production data including, for example, pressures, flow rates, fluid rates, proppant rates, proppant sizes, diversion rates, diversion volumes, diverter sizes, chemical types, chemical rates, and chemical volumes, may be captured using a data acquisition unit 190, which may be a computing device or information handling system. Captured data may be used for simulation, modeling calibration, fracture network modeling, to guide drilling operations and production management, or any combination thereof. A control system 180 may be coupled to one or more of the equipment for the first well 130 and the second well 170, and may use data captured by the data acquisition unit 190 to improve control of one or more of the drilling, exploration, and sensing activities. While FIG. 1 illustrates an onshore subsurface environment at a surface 113, the present disclosure additionally contemplates an offshore environment (not shown).

FIG. 1 includes an exemplary fiber optic sensing system comprising a fiber optic cable 192 installed along the casing 154 of a monitoring well 170, in accordance with one or more embodiments of the present disclosure. In one or more embodiments, a fiber optic cable 192 may be inserted in the annular space outside of the casing 154 of a monitoring well 170, such that the cable is between the casing 154 and the formation 102 that is to be monitored, and the fiber optic cable is then cemented in place as shown by cement 156. Fiber optic cables may be clamped to the outside of the casing during the deployment and protected by centralizers and cross coupling clamps (not shown). The monitoring well 170 may run generally parallel to a nearby treatment well 130 that is being fractured, as shown by fluid 122 entering fractures in FIG. 1. In one or more embodiments, the fiber optic cable may comprise one or more sensors distributed along a wellbore, including the horizontal section of the wellbore, such that the pressure sensors are distributed spatially along the length of the casing and the sensors will respond to formation pressure as a result of their being outside the casing. The pressure sensors may measure pressure data from multiple locations at measurements speeds ranging from milliherz (mHz) to kilohertz (kHz). For example, the fiber optic cable may be based on slim-line pressure, temperature, acoustic, and/or strain sensing fibers or multiple sensing technologies multiplexed in one fiber or multiple fibers, as discussed herein. Other types of permanent sensors may include surface and down-hole pressure sensors.

Figure 2:
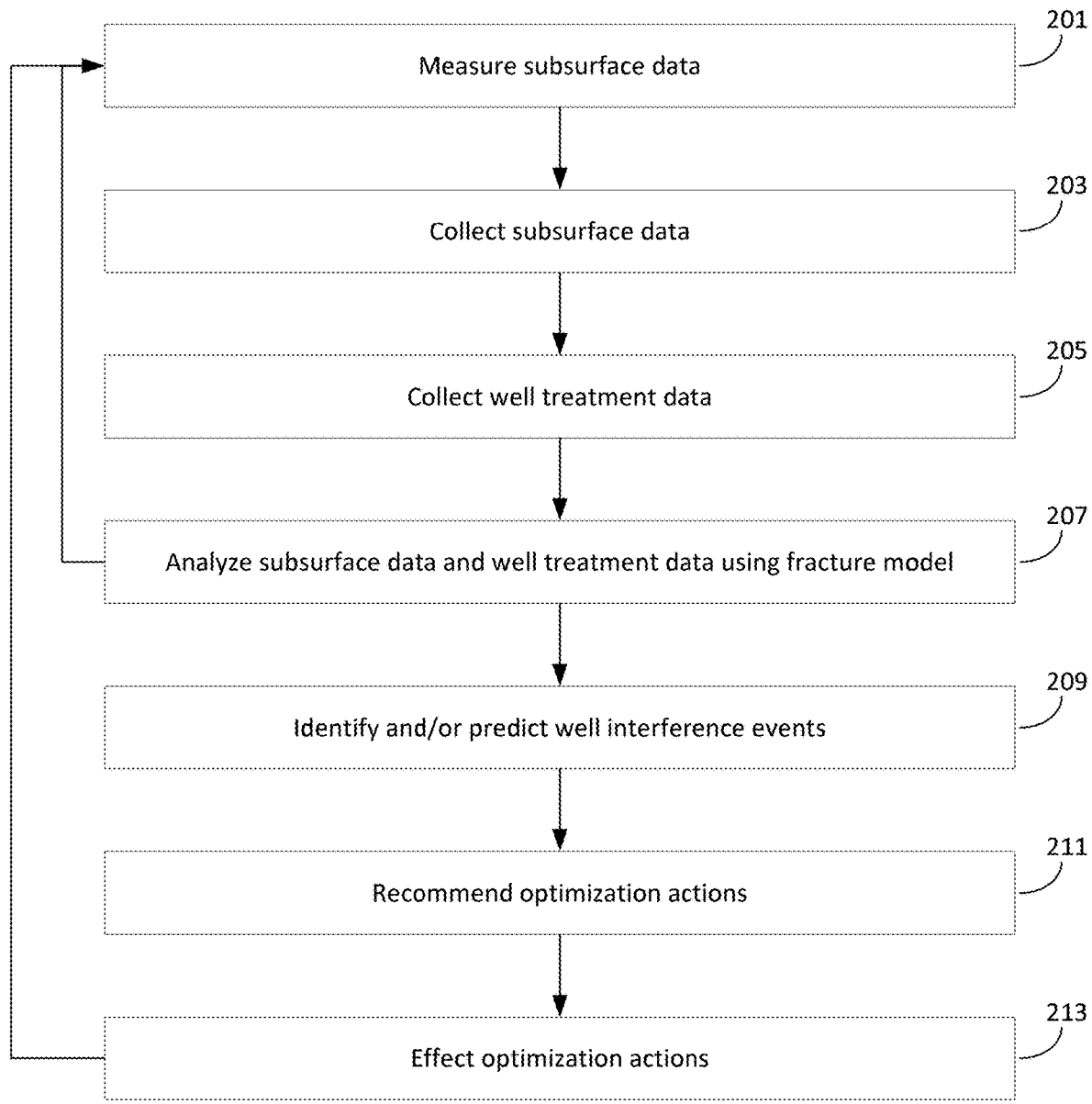
FIG. 2 is a flow diagram illustrating one or more embodiments of a process for optimizing fracturing treatment by suggesting fracturing treatment optimization actions based, at least in part, on a fracture network model incorporating subsurface sensor data and well treatment data.

FIG. 2 is a flow diagram illustrating one embodiment of a process for suggesting fracturing treatment optimization actions based, at least in part, on a fracture network model incorporating subsurface sensor data and well treatment data. In step 201, one or more sensors may measure subsurface data, including, for example, subsurface pressure data. As disclosed herein, the one or more sensors may comprise a fiber optic cable with one or more optical fibers.

In step 203, the surface pressure sensor may collect the subsurface data from the one or more subsurface sensors. In one or more embodiments, the fiber optic cable may include a single-mode fiber (SMF) that is interrogated by a distributed acoustic sensing (DAS) system. Collected DAS data may be processed for microseismic data and low frequency filtered data (dynamic strain) for use in microdeformation monitoring. The single-mode fiber may include Fiber Bragg Gratings (FBGs) used to detect one or more of subsurface pressures, temperatures, and strain. The fiber optic cable may be interrogated using other systems, including, for example, DSS and DTS systems. In one or more embodiments, a single fiber may be interrogated using multiple systems. For example, a splitter may be used in time-division multiplexing systems or an optical switch may be used with different equipment to interrogate the optical fiber. In one or more embodiments, the system may comprise one or more surface pressure sensors. The subsurface pressure sensors may be coupled to the fiber optic cable to collect subsurface data from the fiber optic cable at speeds ranging from mHz to kHz.

In step 205, one or more sensors and systems, for example, the data acquisition unit 190 of FIG. 1 may be coupled to a fiber optic cable 192 and may collect data corresponding to the treatment of a treatment well 130 or a monitoring well 170. Treatment parameters used in the fracture network model may be collected from numerous sources such as historical and regional data including, for example, permeability, porosity, in situ stresses, and the existence of natural fractures in the area; planned fracture treatment schedules; actual treatment data including, for example, surface rates, pressures, concentrations, chemicals, proppants, and volumes, which may be obtained in real time from the on-site fracturing data acquisition unit 190 and control system 180; wellbore geometry and trajectory; logs of various types; actual and predicted data collected from previous wells and well stages; and poroelastic pore pressure, microseismic, temperature, and strain data.

In one or more embodiments, the system may comprise a fracture network model. A fracture model may comprise a set of equations expressed as a mathematical model implemented in software that corresponds to the subsurface physics. This fracture model may be applied to data corresponding to one or more wells to generate a model of a fracture network specific to the one or more wells. This model of a fracture network, or a fracture network model, may be used to analyze data acquired by the data acquisition unit 190, including, for example, subsurface data and may be modified based, at least in part, on receipt of subsurface data. In step 207, subsurface data may be analyzed. In one or more embodiments, the fracture network model fracture network model may be updated based, at least in part, on this analysis. The fracture network model may incorporate data measured by one or more sensing systems, including data from the fiber optic sensors including one or more interwell fluid interaction effects, microseismic, temperature, and strain data. These data may be used to constrain the solution. Because there is often uncertainty in many of the fracture network model input parameters, the response of the well as indicated by one or more of interwell fluid interaction effects, microseismic, temperature, and strain data, where one or more of these effects and data may be used to constrain the calculated fracture network model parameters to modify the model to improve its accuracy and ability to predict and represent the physical well, fracture, and reservoir system. These improvements enable the fracture network model to identify fractures and the features of these fractures including, for example, fracture orientation, complexity, height, length, and growth rates. In one or more embodiments, the fracture network model may be modified based, at least in part, on well treatment data corresponding to the one or more parameters corresponding to wells specific to the fracture network model including, for example, fluid rates, proppant rates, proppant sizes, diversion rates, diversion volumes, diverter sizes, chemical types, chemical rates, and chemical volumes. In one or more embodiments, process 200 may return to and repeat steps 201-207, which may be performed iteratively to improve the quality and the accuracy of the fracture network model.

In step 209, one or more well interference events may be identified based, at least in part, on the fracture network model. For example, the fracture network model may detect an arrival time and distance along the wellbore where pressure is detected. The fracture network model may predict one or more well interference events, including, for example, where and when a well interference event may occur, and where a fracture may intersect another well. In one or more embodiments, fracture network models may be used for prediction of any one or more of future fracture growth, hydraulic pressure, poroelastic pore pressure, strain in any direction, stress in any direction, and enable an improved understanding of completion-related effects. A fracture network model may enable simulation of multiple scenarios to permit selection of an improved or optimized stage plan for one or more subsequent fracturing stages. Accordingly, the system comprising a fracture network model may improve on existing oil and gas production implementations by permitting optimization of one or more fracturing stages including, for example, by minimizing well interference events.

In one or more embodiments, the fracture network model may comprise one or more sophisticated fracture network models, including, for example, proprietary fracture network models such as the Complex Fracture network model. Sophisticated fracture network models may be capable of calculating fracture dimensions, rock strain, rock stress, hydraulic pressure, and poroelastic pore pressure in addition to pressure response to a fracture treatment injection. Simplified models, including, for example, an elliptical parametric model, which may describe a fracture network as a whole, may be incapable of calculating the detailed stress, strain, hydraulic, and poroelastic pore pressure response along the wellbore in the formation. The present disclosure enables the simultaneous calculation of both the hydraulic and poroelastic pressure response in a coupled manner for any combination of treatments, offsets, and monitoring wells which is an improvement to existing technologies. The fracture network model may be a forward model and actual responses may be matched by adjusting input parameters such as rock, petrophysical, and friction properties. In the same way, the fracture network model may calculate a poroelastic pressure response outside of the casing along the wellbore of the monitoring well, which may be matched to a pressure response measured by the fiber optic cable with pressure sensing points. The strain along the wellbore calculated by the fracture network model may be matched to strain from microdeformation strain monitoring. This data may provide constraints to the fracture network model solution that enables more accurate fracture matching. Further, the fracture network model enables the fracture matching process to be optimized using automated matching and iterative processes.

In one or more embodiments, the fracture network model, which may incorporate reservoir flow effects, may enable calculation of one or more interwell fluid interaction effects, including, for example, one or more of a subsurface poroelastic effect, a fracture leakoff effect, a reservoir fluid flow effect, and a hydraulic connection effect, thereby generating a specific model of the specific fracture network. Dynamic subsurface poroelastic effects may enable determination of fluid movement in the porous medium of the subsurface formation, and, therefore, may enable responses that limit or eliminate potential detrimental effects including frac hits and unintended hydraulic connections. If a frac hit or hydraulic connection occurs, the fracture network model may enable determination of one or more fracture leakoff effects and one or more hydraulic connection effects including reductions in subsurface pressure, flow rates, and other production data. The complex fracture network model may enable determination of hydraulic flow effects, including where and how fluid is moving subsurface.

In step 211, one or more fracturing treatment optimization actions, including, for example, well interference mitigation actions, may be recommended based, at least in part, on the fracture network model. In step 213, one or more of the one or more fracturing treatment optimization actions may be effected. In one or more embodiments, the treatment of one or more of the treatment well and the monitoring well may be altered by, for example, modifying one or more parameters, including, for example, fluid rates, proppant rates, proppant sizes, diversion rates, diversion volumes, diverter sizes, chemical types, chemical rates, and chemical volumes. In one or more embodiments, the fracture network model may suggest one or more of these modifications and these modifications may be effected manually. In one or more embodiments, the fracture network model may suggest and effect modifications automatically. In one or more embodiments, modifications may involve a combination of manual inputs and automatic processes. In one or more embodiments, after enabling modifications to the treatment of one or more of the treatment well and the monitoring well to reduce or eliminate well interference, process 200 may return to step 201 and repeat one or more of the steps of process 200. In one or more embodiments, computing device 500 may enable one or more of the steps disclosed in FIG. 2. For example, the computing device 500 may comprise one or more applications or modules associated with the implementing the fracture network model, with the analysis of the subsurface data and well treatment data, with suggesting fracturing treatment optimization actions, and with effecting fracturing treatment optimization actions.

Fracturing treatment optimization actions may include actions in the treatment well, the monitoring well, or both. For example, in the monitoring well, mitigation actions may include pumping additional fluid downhole, which may increase pressure in the monitoring well. Additional mitigation actions in the monitoring well may include adding one or more diverter materials, chemicals, and other materials to the injected fluid to selectively control fluid inflow along the monitoring well. These mitigation actions in the monitoring well may attempt to control any resulting subsurface pressure increase such that the pressure differential between the fracture and the monitoring well may be controlled to mitigate well interference effects.

Similarly, in one or more embodiments, fracturing treatment optimization actions in the treatment well may include modifying fluid flow rates. For example, depending on the scenario, mitigation actions may include modifying fluid flow rates, including, for example, increasing and decreasing fluid flow rates, introducing periodic oscillations in the fluid flow rates, removing periodic oscillations in the fluid flow rates, and modifying the rates of the periodic oscillations in the fluid flow rates. Additional mitigation actions may include varying proppant concentration and proppant size, introducing diverter materials, and introducing chemicals to the fluid pumped downhole in the treatment well. These mitigation actions to treatment of the monitoring well may change the pressure distribution along the wellbore and fractures. These controllable changes in pressure resistance between the surface treatment pressure and the fracture may mitigate or reduce the possibility of frac hits.

In one or more embodiments, the system may measure low frequency strain along the wellbore for microdeformation monitoring, such that individual fractures may be determined from a complex strain profile through an inversion model. In one or more embodiments, the low frequency strain data may be a filtered low frequency data range from a higher frequency data set collected by a Distributed Acoustic Sensing (DAS) system. In one or more embodiments, the strain data may be any strain data measured using any one or more of Brillouin scattering, Rayleigh scattering, direct wavelength detection using FBG sensors, and other sensing principles based, at least in part, on interferometry. In one or more embodiments, the inversion model may incorporate any one or more of treatment well data, the fracture network model, and data from any sensing system installed. The measured strain along the wellbore of the monitoring well may indicate where fractures and fracture fields are approaching the monitoring well. The measured strain may also indicate formation stress changes at the edges of a fracture field. An improved understanding of formation stress and stress shadowing may enable improved fracturing treatments.

In one or more embodiments, microseismic information that may be inferred from one or more of DAS data, and other interferometric sensing data including, for example, Fabry-Perot-based interferometric sensing using two or more FBGs to form interferometers, any TDM-based interferometric sensing technology, and any WDM-based interferometric sensing technology, and any combination of TDM/WDM-based interferometric sensing technology. The microseismic information may include azimuth, calculated fracture lengths, calculated fracture widths, and calculated fracture heights, the complexity of fractures, fracture growth over time, and other related information. Microseismic events may occur near the tip of a fracture as the subsurface formation fractures. Microseismic events may also occur where formation stress changes. A good understanding of formation stress and stress shadowing may enable improved fracturing treatments.

In one or more embodiments, the fiber optic cable disclosed herein may comprise an FBG-inscribed in a modified optical fiber. The FBG-inscribed fiber may be designed to exhibit an enhanced degree of birefringence that may be proportional to the hydrostatic pressure applied to it. This birefringence may cause the FBG to reflect at two peak optical wavelengths simultaneously, where the difference between these wavelengths is a function of the applied pressure. These reflecting wavelengths may be measured using an appropriate optoelectronic readout unit and hence the pressure at the sensor may be inferred. For example, in one or more embodiments, in an initial baseline measurement, a responsive signal may show a difference between the wavelengths reflected by the FBG. If a change in the subsurface pressure occurs, the responsive signal may change, such that the difference between the wavelengths reflected by the FBG is greater than in the baseline measurement.

Certain key features of an FBG-inscribed sensor improve its performance in implementations directed to detecting well interference. FBG-inscribed sensors may be coupled to enable multiple sensors to provide measurements at different locations, enabling improved spatial resolution. For example, the FBG-inscribed sensor is formed in a continuous optical fiber, allowing light to be transmitted directly through it. This allows multiple sensors to be connected in series in the same optical fiber. These multiple sensors may be interrogated individually using one of multiple suitable multiplexing techniques discussed herein. For example, if each of the sensors is configured to have its peak reflections at different pair of optical wavelengths to the others, then each sensor may be interrogated simultaneously with a wavelength-division method. See FIGS. 3A-3D. In one or more embodiments, multiple sensors may be separated along the fiber such that light emitted by the fiber at the surface sensor unit will have different round trip times to each sensor, allowing multiple signals to be distinguished using time-division multiplexing. In one or more embodiments, wavelength-division method may allow approximately ten sensors to be multiplexed on a single fiber. If more sensors are needed, multiple optical fibers may be provided. The time-division method may be more technically more challenging to implement but it may allow up to one hundred sensors per fiber.

Another benefit of FBG-inscribed sensors is the small size of these sensors, which reduces the intrusion of the sensors into the cement in comparison with other sensing technologies. The pressure-sensitive element may be an optical fiber with a diameter of approximately 125 or 250 micrometers and the pressure-sensitive part may be less than 50 millimeters long. This small size allows for a small overall sensor package, even when mechanical and sealing elements have been added to protect the sensor from well fluids. The overall cross-section of the sensor may be similar to the flat-pack cable construction to which the FBG-inscribed sensors are coupled. Accordingly, FBG-inscribed sensors may enable reduced perturbation of the well structure.

Yet another benefit of FBG-inscribed sensors is these sensors may be constructed as arrays, which permits quick deployment. An array of sensors may be connected in series and coiled up on the same type of spool used to transport the flatpack cable itself. This may simplify deployment because the sensors may be connected prior to arrival at the well site. Further, these sensors may be spooled off a drum and run into the well like conventional flatpack.

A further benefit to the FBG-inscribed sensor is its small size and low inertia for rapid response to well events. The small size of the sensor enables rapid responses to changes in pressure and temperature. In particular, there may be no need for separate temperature sensor to compensate the pressure signal to account for interference due to changes in temperature. Accordingly, FBG-inscribed sensors may be more limited by surface instrumentation than the sampling rate limitations of the sensors themselves.

Fiber optic cables may house one or more optical fibers and the optical fibers may be one or more single-mode fibers, one or more multi-mode fibers, or a combination of one or more single-mode and one or more multi-mode optical fibers. A fiber optic sensing system may be connected to the optical fibers. The sensing system may comprise one or more of a Distributed Temperature Sensing (DTS) system, a Distributed Acoustic Sensing (DAS) system, and a Distributed Strain Sensing (DSS) system. Additionally, the sensing system may comprise a quasi-distributed sensing system, where multiple single point sensors are distributed along an optical fiber, or a single point sensing system, where sensors are located at the end of the cable.

Fiber optic sensing systems may operate using a variety of sensing principles. Sensing systems include but are not limited to amplitude-based sensing systems, including, for example, DTS systems based on Raman scattering; phase sensing-based systems, including, for example, DAS systems; interferometric sensing systems, including, for example, homodyne or heterodyne techniques where the system may sense phase or intensity changes due to constructive or destructive interference; strain sensing systems, including, for example, DSS using dynamic strain measurements based on interferometric sensors; static strain sensing measurements, including, for example, Brillouin scattering; quasi-distributed sensors, including, for example, FBGs where a wavelength shift is detected and multiple FBGs that may form Fabry-Perot type interferometric sensors for phase- or intensity-based sensing; and single point fiber optic sensors, including, for example, Fabry-Perot-, FBG-, and intensity-based sensors.

In one or more embodiments, electrical sensors may be pressure sensors including quartz-type sensors, strain gauge-based sensors, and other commonly used sensing technologies. Pressure sensors, including optical and electrical sensors, may be housed in dedicated gauge mandrels or attached outside the casing in various configurations for down-hole deployment. Additionally, pressures sensors may be deployed conventionally at the surface well head or flow lines.

In one or more embodiments, a hybrid approach may be desirable, including, for example, a combination of one or more single-point, one or more quasi-distributed, and one or more distributed fiber optic sensors are mixed with, for example, one or more electrical sensors. The fiber optic cable may then include one or more optical fibers and one or more electrical conductors.

In one or more embodiments, temperature measurements from, for example, a DTS system may be used to determine locations of fluid flow near the sensors. For example, fluids from the surface may be cooler than formation temperatures. DTS warm-back analyses may be used to determine fluid volume placement. DTS warm-back analyses may be used for water injection wells and for fluid placement for treatment of a treatment well. Temperature measurements in a monitoring well may be used to determine well interference, including, for example, fluid interactions between the treatment well and monitoring well. Additionally, temperature measurements in a monitoring well may be used to determine formation fluid movement.

In one or more embodiments, DAS data may be used to determine fluid allocation in real-time as acoustic noise is generated when fluid flows through the casing and through perforations in the casing into the formation. Phase- and intensity-based interferometric sensing systems are sensitive to temperature, mechanical, and acoustically-induced vibrations. DAS data may be converted from time series data to frequency domain data using transforms, including, for example, Fast Fourier Transforms (FFT) and wavelet transforms, to generate different representations of the data. Various frequency ranges may be used for different purposes and each indicator may have a characteristic signature in terms of one or more of frequency content, amplitude, and time-dependent behavior. In one or more embodiments, for example, low frequency signal changes may be attributed to formation strain changes or fluid movement. Other frequency ranges may be indicative of fluid or gas movement. Various filtering techniques may be applied to generate indicators of events of interest. Event indicators may indicate formation movement due to growing natural fractures and formation stress changes during the fracturing operations. Event indicators may also indicate fluid seepage during the fracturing operation as formation movement may force fluid into a monitoring well, as well as fluid flow from fractures and one or more of fluid and proppant flow resulting from frac hits. Event indicators may also be present in other data types and not limited to DAS data.

In one or more embodiments, DAS systems may be used to detect various seismic events, where one or more of stress fields and growing fracture networks generate microseismic events, and where perforation charge events may be used to determine travel time between horizontal wells. This information may be used from stage to stage to determine changes in travel time as the formation is fractured and filled with fluid and proppant. The DAS systems may also be used with surface seismic sources to generate vertical seismic profiles before, during, and after a fracturing job to determine the effectiveness of the fracturing job as well as determine production effectiveness.

In one or more embodiments, static strain data may be used to determine absolute strain changes over time, where strain data may be acquired using various DSS systems. In one or more embodiments, static strain data may be measured using Brillouin-based systems. In one or more embodiments, quasi-distributed strain data may be measured using FBG-based systems. Static strain may also be used to determine propped fracture volume by comparing deviations in strain data to a measured strain pre-fracturing baseline. It may also be possible to determine formation properties like permeability, poroelastic responses, and leak off rates based, at least in part, on changes in the measured strain data over time and the rate at which the measured strain data changes over time. Dynamic strain data may be used in real-time to detect and predict fracture growth using an appropriate inversion model.

Fiber Bragg Grating-based systems may also be used for a number of different measurements. FBGs are partial reflectors that may be used as temperature and strain sensors. FBGs may also be used to make various interferometric sensors with very high sensitivity. FBGs may be used to make point sensors or quasi-distributed sensors where these FBG-based sensors may be used independently or in combination with other types of fiber optic-based sensors. FBGs in an optical fiber may be manufactured to respond to a signal at a specific wavelength. In one or more embodiments, Wavelength Division Multiplexing (WDM) may be used with FBGs and one or more other systems, including, for example, DAS, DSS, and DTS systems, where each system may be configured to operate in one or more bands of wavelengths in the same fiber, enabling simultaneous measurements of multiple parameters. In WDM applications, a pulse comprising a broad range of wavelengths may be injected into the optical fiber and the resulting response may be indicative of these multiple parameters. FIG. 3 is an illustration of exemplary signals provided to and received from an exemplary fracturing treatment optimization configuration. For example, in FIG. 3A, light spanning multiple wavelengths may be transmitted down the optical fiber. A signal reflecting from the first FBG might appear like the signal in FIG. 3B, while a signal reflecting from the first and second FBG might appear like the signal in FIG. 3C, and a signal also reflecting off a third FBG might appear like FIG. 3D.

In one or more embodiments, reflections from the FBGs may be used to determine a location along the fiber where the measured data originates. For example, in one or more embodiments, the time of flight of a pulse sent into the optical fiber may indicate where the measurement occurred. For example, in FIG. 4A, a pulse spanning multiple wavelengths may be transmitted down the optical fiber. Signals reflecting from three FBGs might appear like the signal in FIG. 4B. This shows that the reflected signals arrive back at different times and can be separated by inserting time gates at the locations shown. In one or more embodiments, a continuous transmission of light along the fiber may be used to measurement subsurface data. For example, a continuous transmission may enable measurements to be collected using wavelength-division multiplexing, where certain wavelengths respond to certain FBGs along the optical fiber, as discussed herein.

In one or more embodiments, sensors may be used to measure well interactions by placing them along either the treatment well, along the monitoring well, or along both wells. One or more parameters, including, for example, the treatment well pressure, rate, proppant concentration, diverters, fluids and chemicals may be altered to change the hydraulic fracturing treatment. These changes may impact the formation responses in several different ways. For example, in one or more embodiments, stress fields may change, and this may generate microseismic effects that may be measured with one or more of DAS systems and single point seismic sensors like geophones. Fracture growth rates may change, which may be measured as microseismic events and event distributions over time, or as changes in the measured strain using the low frequency portion of a DAS signal or Brillouin-based sensing systems. Pressure changes due to one or more interwell fluid interaction effects may be measured in the monitoring well. Pressure data may be measured in the treatment well and correlated to formation responses. Various changes in treatment rates and pressure may generate events that may be correlated to fracture growth rates Several measurements may be combined to determine adjacent well interactions, and this information may be used to modify one or more fracturing treatment optimization actions to generate desired outcomes. For example, the measurement data captured by these sensors may be combined with a subsurface fracture network model to improve real-time analytics and make predictions about how to optimize oil and gas production. Real-time subsurface data enables operators, automatic systems, or a combination of both to mitigate detrimental subsurface effects by taking appropriate actions. Appropriate actions may include, for example, modifying one or more parameters associated with treatment of a treatment well, a monitoring well, or both a treatment and a monitoring well. As described herein, modifying one or more parameters may comprise modifying a hydraulic fracturing treatment schedule, dynamically changing fluid flow rates to a treatment well, a monitoring well, or both a treatment and a monitoring well, adding one or more diverters or chemicals into the fracturing fluid, and changing proppant concentrations and types.

Any one or more embodiments of the present disclosure may be implemented through a computer-executable program of instructions, such as program modules, generally referred to as software applications or application programs executed by a computer. A software application may include, for example, routines, programs, objects, components, data structures, any other executable instructions, or any combination thereof, that perform particular tasks or implement particular abstract data types. The software application may form an interface to allow a computer to react according to a source of input. For example, an interface application may be used to implement any one or more embodiments of the present disclosure. The software application may also cooperate with other applications or code segments to initiate a variety of tasks based, at least in part, on data received, a source of data, or any combination thereof. Other applications or code segments may provide optimization components including, but not limited to, neural networks, earth modeling, history-matching, optimization, visualization, data management, and economics. The software application may be stored, carried, or both on any variety of memory such as CD-ROM, magnetic disk, optical disk, bubble memory, and semiconductor memory (for example, various types of RAM or ROM). Furthermore, the software application and one or more inputs or outputs may be transmitted over a variety of carrier media including, but not limited to wireless, wired, optical fiber, metallic wire, telemetry, any one or more networks (such as the Internet), or any combination thereof.

Moreover, those skilled in the art will appreciate that one or more of the embodiments may comprise a variety of computer-system configurations, including hand-held devices, multiprocessor systems, microprocessor-based or programmable consumer electronics, minicomputers, mainframe computers, and any combination thereof Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software, or any combination thereof, in a computer system, information handling system, or other processing system.

Figure 5:
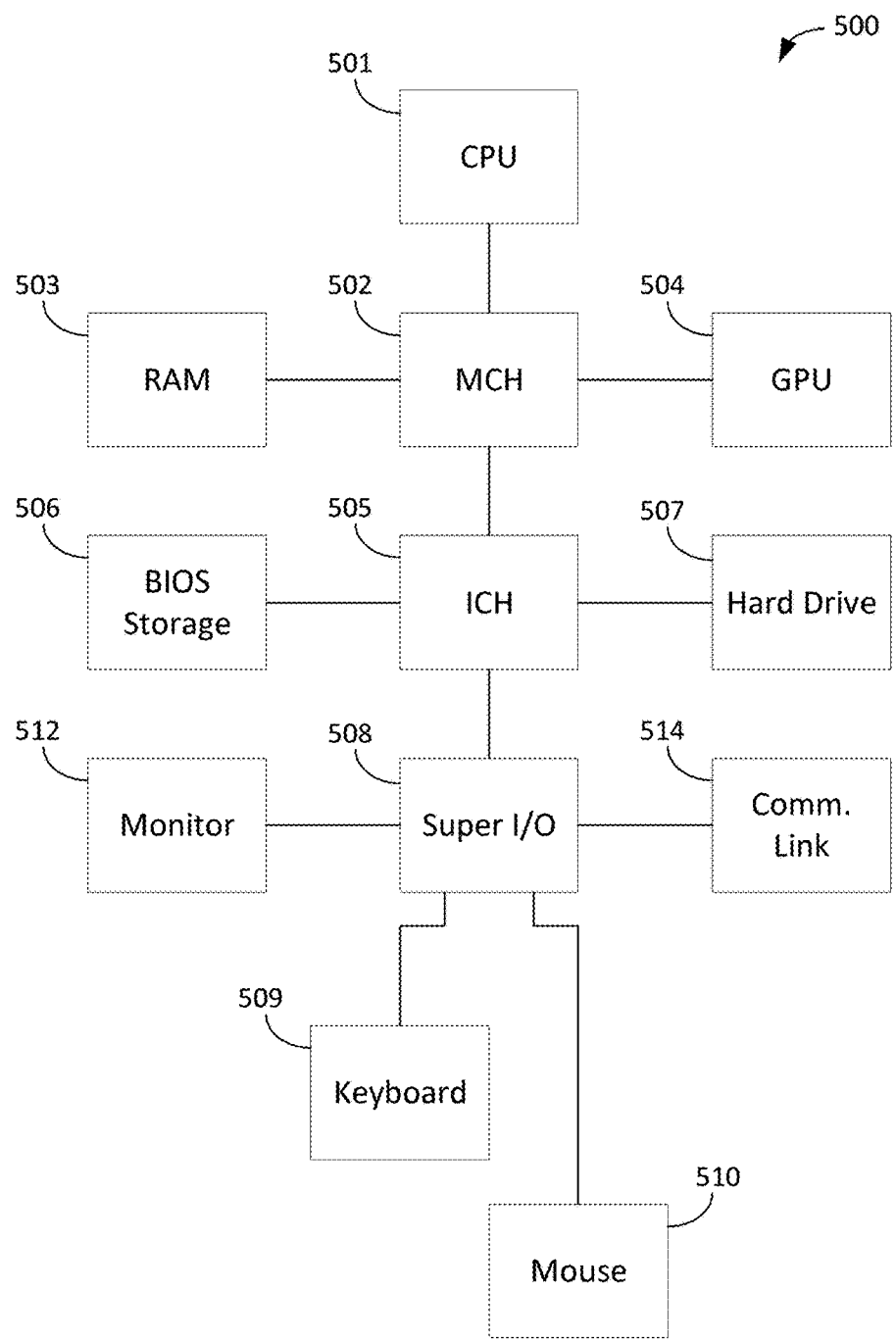
FIG. 5 is a diagram of an example information handling system, according to one or more aspects of the present disclosure.

Referring now to FIG. 5, a block diagram illustrates one embodiment of a system for implementing one or more embodiments of the present invention. The system includes a computing device 500, sometimes referred to as a computing system or information handling system, which comprises memory such as random access memory (RAM) 503, application programs (not shown here), a user interface 508 comprising a mouse 510 and a keyboard 509, a video interface 504, and a central processing unit (CPU) 501. The CPU 501, the video interface 504, and the RAM 503 may be connected a memory controller hub (MCH) 502. The system may also include one or more storage devices, such as a read-only memory (ROM) storage element containing instructions for a basic input and output system (BIOS) 506 and a hard drive 507. The ROM 506, the hard drive 507, and the user interface 508 may be connected to one another via an input/output controller hub (ICH) 505. The MCH 502 and ICH 505 may be connected to one another. The computing device is only one example of a suitable computing environment and is not intended to suggest any limitation as to the scope of use or functionality of the disclosure.

A memory or storage device primarily stores one or more software applications or programs, which may also be described as program modules containing computer-executable instructions, which may be executed by the computing unit for implementing one or more embodiments of the present disclosure. The memory, therefore, may include one or more applications including, for example, a data collection application and a subsurface fracture network modeling application, which may enable one or more of the processes or sub-processes illustrated in FIG. 2. These applications may integrate functionality from additional or third-party application programs or from system files stored in memory or on a storage device. An application may perform one or more of the steps in FIG. 2. System files, such as an ASCII text file may be used to store the instructions, data input, or both for the reservoir simulator as may be required in, for example, one or more steps of FIG. 2 discussed herein. In one or more embodiments, any one or more other applications may be used in combination. In one or more embodiments, any one or more other applications may be used as stand-alone applications.

Although the computing device 500 is shown as having one or more generalized memories, the computing device 500 may include a variety of non-transitory computer readable media. By way of example, and not limitation, non-transitory computer readable media may comprise computer storage media and communication media. The memory may include computer storage media, such as a ROM and RAM in the form of volatile memory, nonvolatile memory, or both. A BIOS containing the basic routines that help to transfer information between elements within the computing unit, such as during start-up, may be stored in the ROM. RAM may contains data, program modules, other executable instructions, or any combination thereof that are immediately accessible to, presently being operated on, or both by the processing unit. By way of example, and not limitation, the computing device 500 may include an operating system, application programs, other program modules, and program data.

The components shown in the memory may also be included in other removable/non-removable, volatile/non-volatile non-transitory computer storage media or the components may be implemented in the computing device 500 through an application program interface ("API") or cloud computing, which may reside on a separate computing device connected through a computer system or network (not shown). For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that may be used in the exemplary operating environment may include, but are not limited to, magnetic tape cassettes, flash memory cards, digital versatile disks, digital video tape, solid state RAM, solid state ROM, or the like. The drives and their associated computer storage media discussed above provide storage of computer readable instructions, data structures, program modules, and other data for the computing unit.

The computing device 500 may receive commands or information from a user through the user interface 508 and the associated input devices such as a keyboard 509 and a mouse 510. Input devices may comprise a microphone, joystick, satellite dish, scanner, voice or gesture recognition, and the like (not shown). These and other input devices are often connected to the processing unit through the user interface 508 that is coupled to the ICH 505, but may be connected by other interface and bus structures, such as a parallel port or a universal serial bus (USB) (not shown).

A monitor or other type of display device (not shown) may be connected to the MCH 502 via an interface, such as a video interface 504. A graphical user interface ("GUI") may also be used with the video interface 504 to receive instructions from the user interface 508 and transmit instructions to the central processing unit 501. A GUI may be used to display the outputs of the processes described in FIG. 2, and may be used to prompt or display modification of subsurface operations or production activities. In addition to the video interface 504, the computing device 500 may also include other peripheral output devices such as speakers, printer, external memory, any other device, or any combination thereof (not shown), which may be connected through an output peripheral interface (not shown).

Although many other internal components of the computing device 500 are not shown, those of ordinary skill in the art will appreciate that such components and their interconnection are well known.

Figure 6:
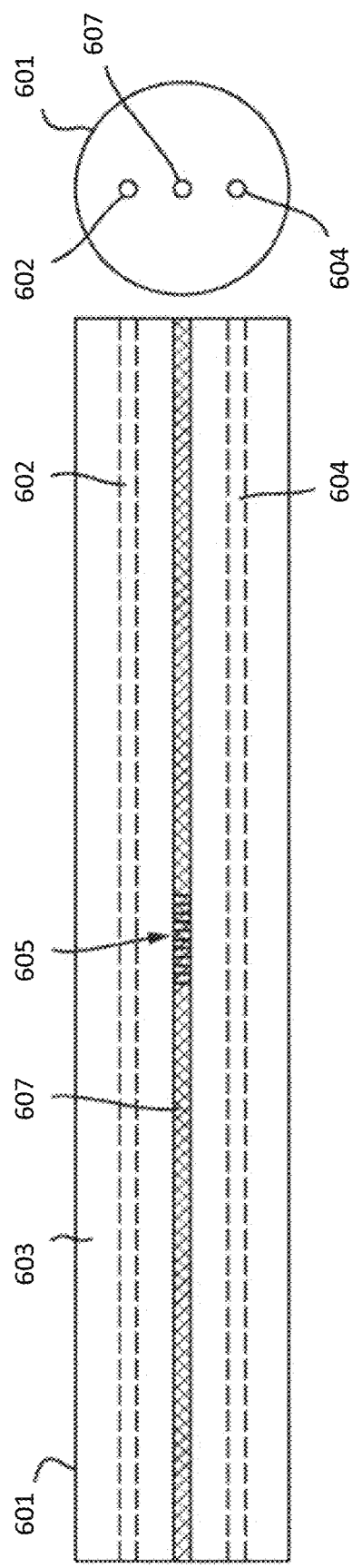
FIG. 6 is a cross-sectional illustration of a side view and an end view of an optical fiber.
Figure 7:
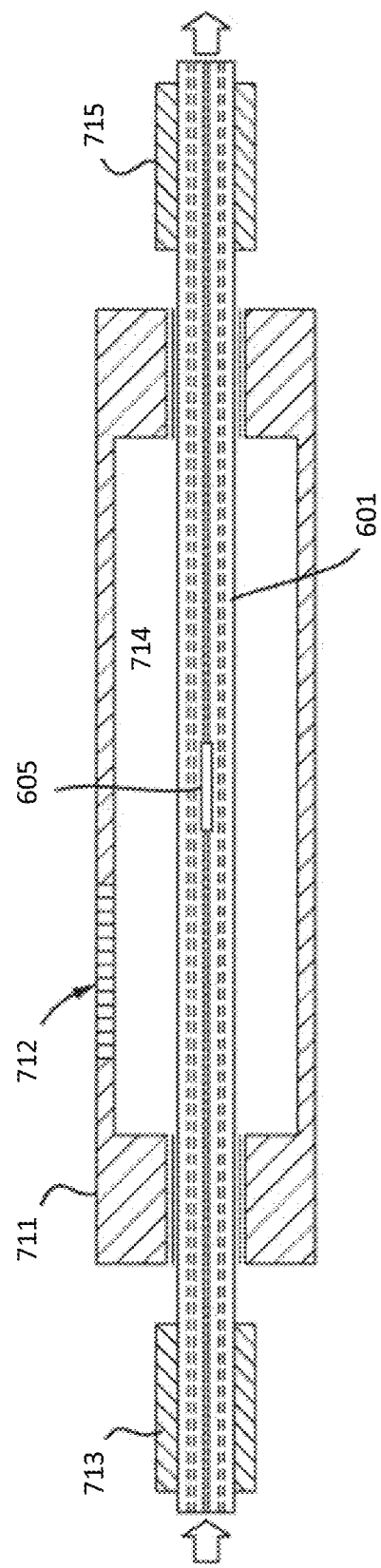
FIG. 7 is a cross-sectional illustration of a side view of an optical fiber during internal etching.
Figure 10:
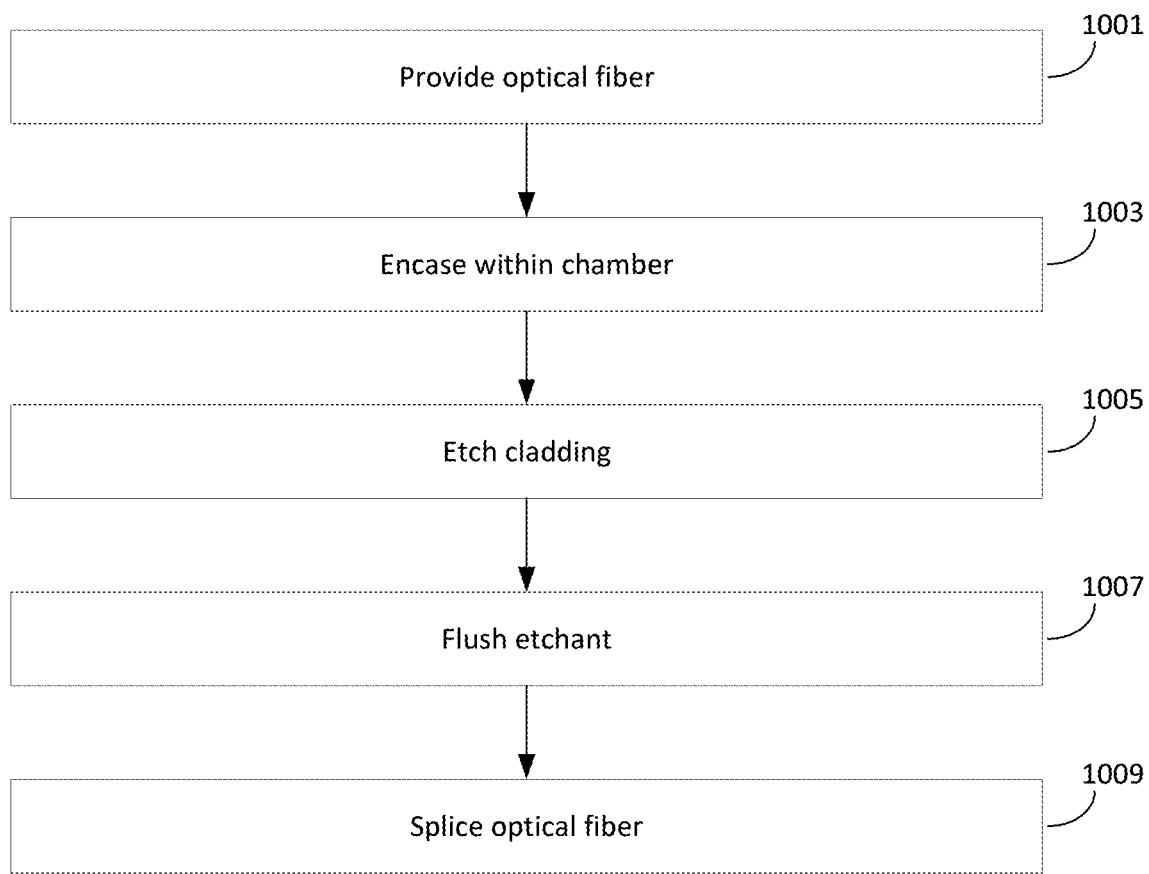
FIG. 10 is a flow diagram illustrating a method for forming a pressure sensor.

One or more embodiments of a method for forming a pressure sensor using a slim-line pressure and temperature sensing fiber optic cable will now be discussed with reference to FIGS. 6-19. The method begins at step 1001 of FIG. 10 when a waveguide in the form of an optical fiber 601 is provided. The optical fiber 601 may be constructed from a cylindrical preform (not shown) having a core and a cladding which surrounds the core. The preform may have a diameter of 3-6 cm and may be 0.5-2 m in length (although other sizes are also possible). A pair of parallel holes may be drilled into the cladding of the pre-form, for example, at 1-2 cm either side of the core. Optionally, silica glass tubes may be inserted into the holes of the preform after drilling. The pre-form may be then drawn to form the optical fiber 601 shown in FIG. 6 using standard drawing techniques. The silica glass tubes (if provided) will then become amalgamated with the surrounding material of the preform during this process, whilst preserving the presence of the holes.

If the holes which are drilled into the pre-form are too large, then they may collapse during the drawing process. Care may be taken, therefore, to avoid this. An optical sensor in the form of a FBG 605 may be then formed along the core 607 by directing spatially-varying patterns of ultraviolet or infrared light onto the core 607. A photosensitive core 607, such as a germanium-doped silica fiber, may be used such that the ultraviolet light creates systematic variations in the refractive index of the core 607.

The first and second holes 602, 604 may be cylindrical voids within the cladding 603 which form part of a birefringence structure for inducing birefringence within the core 607. These holes 602, 604 may extend parallel to the core 607, on opposing sides of the core 607, and at approximately equal distances from the core 607. This may be illustrated by FIGS. 6 and 8, which show a cross-sectional side view of a section of the optical fiber 601 to the left and a cross-sectional end view of the optical fiber 601 to the right. The optical fiber 601 may have a nominal 125 micrometer diameter. The core 607 may have a diameter of 10 micrometers. The first and second holes 602, 604 also each have a diameter of 10 micrometers and may be axially displaced from the central axis of the core 607 by 20-30 micrometers. Larger diameters holes may also be used, including, for example, in the range of 10-20 micrometers; however, the diameter of the holes and their spacing from the core 607 may be chosen according to the diameter of the cladding 603. For example, if a larger cladding with a diameter of 280 micrometers may be used, 20 micrometer diameter holes may be chosen each separated by 100 micrometers from the core.

At step 1002, a portion of the length of optical fiber 1 may be encased within a chamber defined by an elongate housing 711. This may be shown by FIG. 7, wherein the housing 711 may be substantially cylindrical and forms a sleeve. In one or more embodiments, the portion of optical fiber 601 that may be encased within the housing 711 may already contain the FBG 605 inscribed to it. In one or more embodiments, the FBG 605 may be written onto the optical fiber 601 once the optical fiber 601 may have been encased within the housing 711. The housing 711 may, therefore, comprise a window in such embodiments so as to enable an external light source, including, for example, a laser, to write the FBG 605 onto the optical fiber 601.

The optical fiber 601 may be held taut between apertures provided on opposing ends of the housing 711 by clamps 713, 715 so as to extend through the chamber. The housing 711 may thus fix the length of the portion of optical fiber 601 contained so as to protect against differential thermal expansion effects on the optical fiber 601.

The housing 711 may be sealed at the opposing apertures through which the optical fiber 601 extends. The seals may be formed of an epoxy resin. In the event the optical fiber 1 may be metal-coated, a metal-to-metal seal may be applied including, for example, by soldering or brazing. Suitable sealant materials include, for example, stainless steels, nickel alloys, gold-based solders, and brass. In one or more embodiments, a glass-to-metal seal may be applied, for example, by the use of a glass mixture having a lower melting point than the cladding 603 and the housing 711. A substantially non-compressible fluid 714 may be then introduced to the chamber using one or more ports (not shown). The fluid 714 could be one of a variety of inert liquid. Suitable examples include mineral oil, silicone oil, grease or a liquid metal based on gallium or indium and their alloys. In other examples, this fluid 714 may be introduced to the chamber before the portion of optical fiber 601 is encased within the housing 711.

The housing 711 may be formed of a corrosion resistant alloy including, for example, (RTM), one capable of resisting the harsh environments found within a well of a hydrocarbon reserve. The housing 711 may comprise a pressure transfer element in the form of a flexible diaphragm 712 that forms part of the walls surrounding the optical fiber 601. The diaphragm 712 may be located anywhere along the housing 711 so as to form a barrier between the fluid 714 contained within and any surrounding fluids outside of the housing 711. In one or more embodiments, the diaphragm 712 may form a discrete part of the walls of the housing 711. In one or more embodiments, the diaphragm 712 may fully surround the encased portion of optical fiber 601. The diaphragm 712 may be formed of a corrosion resistant flexible material and so may comprise the same material as the remainder of the housing 711 including, for example, Inconel (RTM), albeit made sufficiently thin so as to flex without breaking under normal operating conditions. The diaphragm 712 may be configured to flex so as to transmit a hydrostatic pressure applied to the outside of the housing 711 into the fluid 714 so as to equalize the hydrostatic pressure on opposing sides of the diaphragm 712. In one or more embodiments, bellows may be used instead of the diaphragm 712. Alternatively, the pressure transfer element may take the form of an aperture which may be open so as to expose the substantially non-compressible fluid 714 to any surrounding process fluid. In this case, a substantially non-compressible fluid 714 may be used which may be immiscible with the surrounding process fluid.

The housing 711 may be constructed so as to isolate the encased portion of optical fiber 601 from any axial stresses caused by thermal expansion of the housing 711. For example, the housing 711 may be further formed of one or more low-expansion materials including, for example, Invar (RTM), other nickel-iron alloys, Kovar (RTM), or a carbon fiber composite. Alternatively, the portion of optical fiber 601 may be held slightly slack between opposing ends of the chamber so as to compensate from any axial expansion of the chamber. Such axial stresses may not affect any pressure measurements; however, they could interfere with any temperature measurements obtained using the FBG 605.

At step 1003, with the portion of optical fiber 601 encased within the housing 711, an etching process may be performed. In one or more embodiments, the optical fiber 601 may be etched internally. A liquid etchant may be flowed through the first and second holes 602, 604 through the portion of optical fiber 601 encased within the housing and along the direction indicated by the rightward pointing arrows in FIG. 7. The liquid etchant may be an aqueous solution of hydrofluoric acid, although a more controllable option may be the Buffered Oxide Etch (BOE), which is a mixture of aqueous solutions of ammonium fluoride and hydrofluoric acid. The use of BOE may be particularly advantageous because BOE maintains its activity as it is used, thus it allows for a consistent etching rate.

Figure 8:
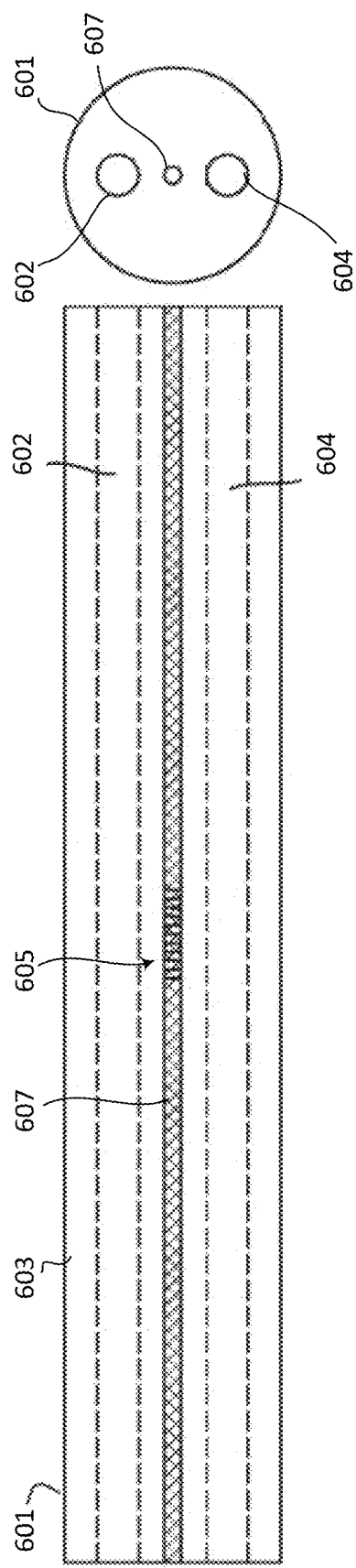
FIG. 8 is a cross-sectional illustration of a side view and an end view of an optical fiber after internal etching.
Figure 9:
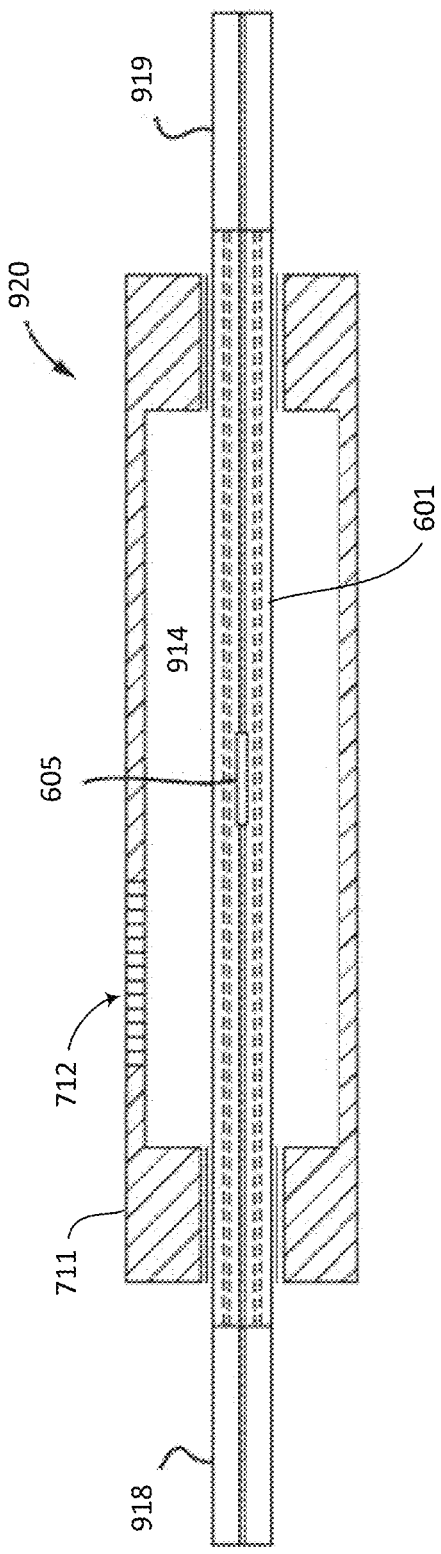
FIG. 9 is a cross-sectional illustration of a side view of the pressure sensor.

The etchant may etch the cladding 603 at a predictable rate so as to increase the diameter of the first and second holes 602, 604, as illustrated by FIG. 8. It may not be possible to achieve large and enclosed voids within the cladding 603 without internal etching. This process increases the anisotropic stress acting on the FBG 605 in response to increases in the hydrostatic pressure applied by the fluid 714. In so doing, the sensitivity of the pressure sensor 920 ultimately formed may be increased.

The first and second holes 602, 604 may be located sufficiently towards the center of the cladding 603 so that if the internal etching were allowed to continue, the etchant would eventually come into contact with the core 607, which could degrade its optical transmission properties. Further internal etching would then cause the first and second holes 602, 604 to become exposed to the non-compressible fluid 714. The etchant may be, therefore, passed along the first and second holes 602, 604 for a predetermined amount of time so as to increase the diameter of the first and second holes 602, 604 by a controlled amount, without bringing the etchant into contact with the core 607. The diameter of the first and second holes 602, 604 may be increased from 10 micrometers to 25-35 micrometers by the internal etching. Depending on the width of the cladding 603, wider first and second holes 602, 604 may be desirable. For example, if the cladding is 280 micrometers in diameter, the first and second holes 602, 604 may be internally etched to achieve respective diameters of around 100 micrometers.

At step 1004, the etchant may be then flushed from the first and second holes 602, 604, for example using an inert liquid including, for example, water. This liquid may then be ejected from the first and second holes 602, 604, for example, using a jet of hot air. After the internal etching, the first and second holes 602, 604 remain enclosed within the cladding 603 and each of the core 607 and the first and second holes 602, 604 remain separate and non-interconnected within the optical waveguide 601. In one or more embodiments, the FBG 605 may be written onto the optical fiber 601 after the etching process is complete. At step 1005, the opposing ends of the length of optical fiber 601 held by the grips 713, 715 may be spliced onto first and second single-mode optical fibers 918, 919, respectively. The pressure sensor 920 of FIG. 9 may be thereby formed. Optionally, additional components, such as braces or ducting, may be included to provide mechanical and environmental protection.

The single-mode optical fibers 918, 919 may be solid fibers having a core and a cladding with diameters of 9 and 125 micrometers respectively, and a mode field diameter of approximately 10 micrometers at 1550 nm. These fibers may be widely used for transmitting signals reliably over long distances. It may be, therefore, advantageous to couple the optical fiber 601 to such fibers 918, 919 at either end to ensure compatibility with any peripheral components to the system that may be provided and to increase the ease of any additional splicing that may be required for coupling such components to the pressure sensor 920.

Figure 11:
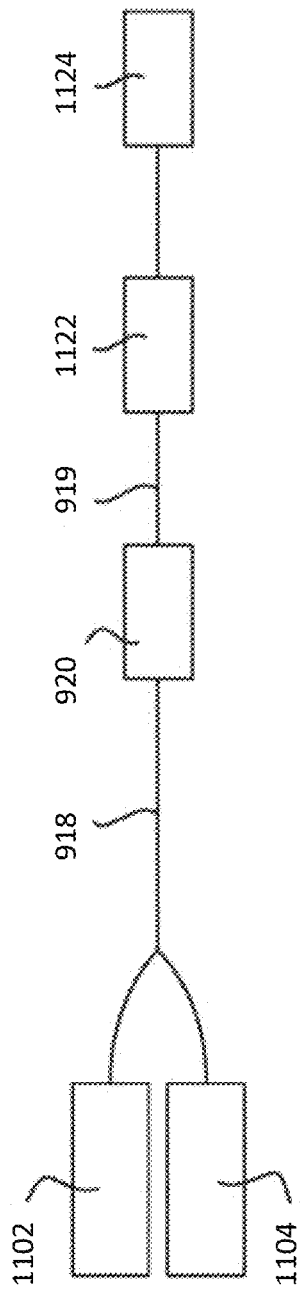
FIG. 11 is a schematic illustration of a system for monitoring pressure.

FIG. 11 schematically illustrates a system for monitoring pressure using this pressure sensor 920. The first single-mode optical fiber 918 may be coupled to a light source 1102 and a detector 1104. In one or more embodiments, the light source may be one or more of a diode and a laser. The second single-mode optical fiber 919 may be coupled to further similarly constructed pressure sensors 1122, 1124 such that the pressure may be measured at a plurality of locations along the resulting waveguide. A distal end of the waveguide protruding from the end pressure sensor 1124 may be connected to a means of suppressing reflections (not shown), such as an optical absorber or an angled cleave. At the opposing proximal end of the waveguide, the light source 1102 may be configured to inject a pulse of light along the waveguide in a first direction. A portion of this light may be then reflected by the FBG provided within each of the pressure sensors 920, 1122, 1124 and travels in a second direction, opposite to the first direction, until it reaches the detector 1104. The wavelength of the reflected light may be monitored by the detector 1104.

Increases in pressure within each of the pressure sensors 920, 1122, 1124 may increase the birefringence along the encased portions of optical fiber. This may cause two distinct signals to be reflected at different peak wavelengths by each FBG. The difference in peak wavelength between these signals may be measured by the detector 1104 and the pressure acting on the sensors 920, 1122, 1124 may be calculated from this.

An optical fiber-based system may be, therefore, provided for measuring the pressure at a plurality of locations along a single waveguide. Advantageously, therefore, if such a system were implemented within a high-pressure environment, including, for example, within a hydrocarbon well, the number of penetrations through each of the pressure barriers that may be required for accommodating the system may be limited to one. This may be practically easier to implement and reduces the number of potential leak points.

A particular benefit of the above technique may be that the cladding 603 is etched whilst the optical fiber 601 is supported within the housing 711 that goes on to form part of the pressure sensor 920. In contrast, if the optical fiber 601 were not supported within the housing 711 during the etching, significant stresses could be applied to the fiber through handling it. For example, if the optical fiber 601 were bent even slightly, the stresses would be concentrated in the region where the cladding 603 was thinnest. It would, therefore, not be possible to remove as much cladding material via etching without making the fiber susceptible to breaking apart when handled. However, since the etched optical fiber 601 no longer requires further handling in order to incorporate it within the pressure sensor, more cladding may be removed during etching and so the sensitivity of the pressure sensor may be increased.

Figure 12:
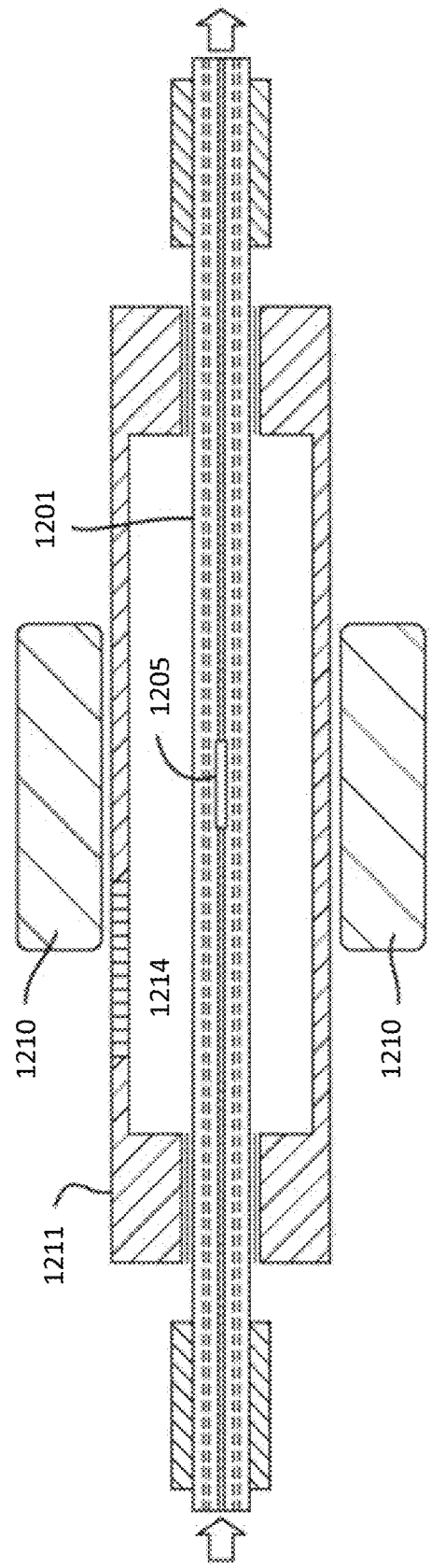
FIG. 12 is a cross-sectional illustration of a side view of an optical fiber during internal etching.
Figure 13:
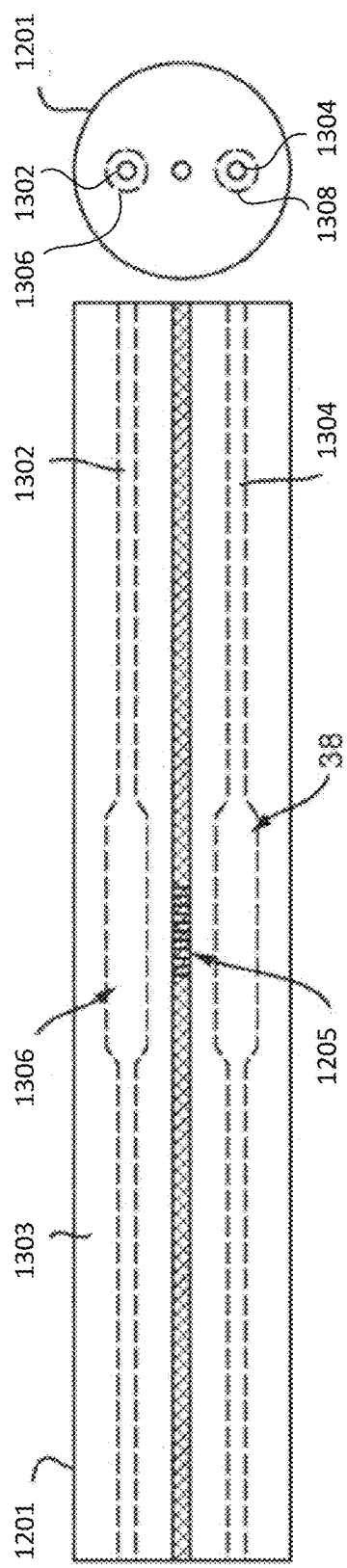
FIG. 13 is a cross-sectional illustration of a side view and an end view of an optical fiber after internal etching.

In one or more embodiments, illustrated by FIGS. 12 and 13, a localized heat source 1210 may be wrapped around the outside of the housing 1211. In one or more embodiments, the localized heat source 1210 may take the form of one or more of a resistive coil, Peltier heater, or an induction heating coil. Once the chamber has been filled with the substantially non-compressible fluid 1214, the localized heat source 1210 may be used to heat a central region of the chamber containing the FBG 1205 (in this case, via the fluid 1214, which may act as a heat transfer medium).

When the liquid etchant may be then conveyed along the first and second holes 1302, 1304 at step 1003, the etching rate may be increased where the temperature of the cladding 1303 may be higher. The internal etching may thus be controlled so as to produce enlarged voids 1306, 1308 within the first and second holes 1302, 1304 respectively along a specific region that encompasses the FBG 1205. The birefringence may thus be increased at this region, without compromising the structural integrity of the remainder of the optical fiber 1201. These voids 1306, 1308 may have a diameter of 45 micrometers whereas the remainder of the first and second holes 1302, 1304 may have a diameter of 25 micrometers.

As previously disclosed herein, the liquid etchant used may be BOE. A useful feature of BOE is the etching rate approximately doubles for every 10 degrees Celsius increase in temperature, within an operating range of 20 to 80 degrees Celsius. Thus, the increased etching may be carefully predicted in advance in accordance from the temperature profile of the cladding 1303. Useful temperature ranges may be generally in the region of 20 to 80 degrees Celsius.

Figure 14:
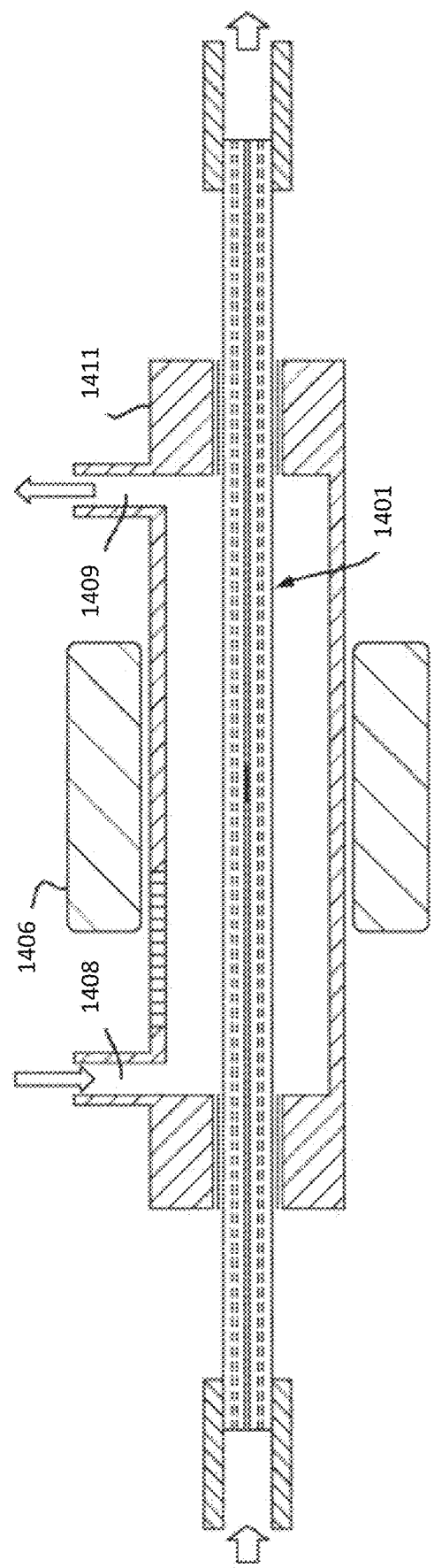
FIG. 14 is a cross-sectional illustration of a side view of an optical fiber during internal and external etching.
Figure 15:
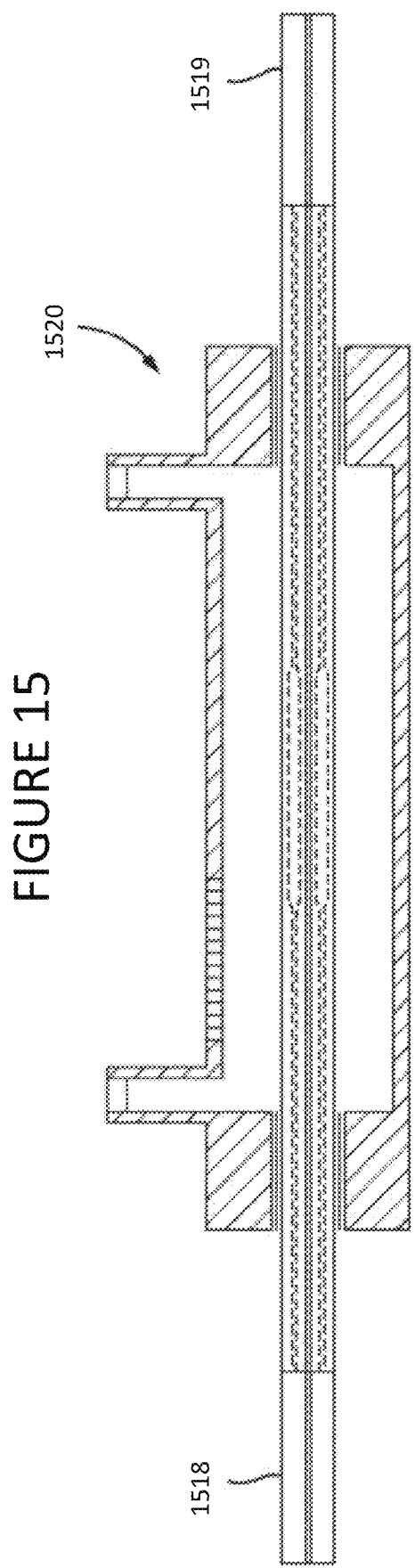
FIG. 15 is a cross-sectional illustration of a side view of the pressure sensor.
Figure 16:
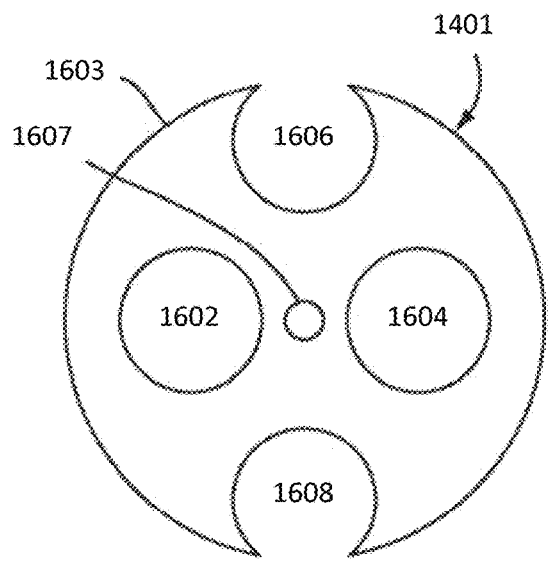
FIG. 16 is a cross-sectional end view of an optical fiber after internal and external etching.

One or more embodiments of a method for forming a pressure sensor 1520 may now be discussed with reference to FIGS. 14-16. In these one or more embodiments, internal etching process may be assisted by use of a heating element 1406, as disclosed herein. In one or more embodiments, external etching of the cladding 1603 may be additionally performed. The birefringence structure further comprises third and fourth holes 1606, 1608 that extend along the cladding 1603 in a direction parallel to the axis of the core 1607. Like the first and second holes 1602, 1604, the third and fourth holes 1606, 1608 may be initially drilled into the preform, which may be then drawn to form the optical fiber 1401. The third and fourth holes 1606, 1608 may be formed at equal distances from the core 1607, on opposing sides of the core 1607 and radially outside of the first and second holes 1602, 1604. The axes of the first and second holes 1602, 1604 lie within a first plane, and the axes of the third and fourth holes 1606, 1608 lie within a second plane, wherein the first plane may be perpendicular to the second plane. The third and fourth holes 1606, 1608 may be initially fully enclosed within the cladding 1603 such that the cladding has a circular profile (as before). At step 1003, a liquid etchant may be introduced into the chamber through an inlet 1408 whereupon it comes into contact with the outside of the cladding 1603. The etchant may be continuously circulated through the chamber via the inlet 1408 and an outlet 1409 during this stage. The etchant may be allowed to etch the cladding 1603, generally reducing its diameter, until the cladding material between each of the third and fourth holes 1606, 1608 and the outside of the optical fiber 1401 may be removed, thereby exposing the third and fourth holes 1606, 1608 to the liquid etchant. At this point, the optical fiber 1401 no longer may have a circular profile, when viewed along a plane perpendicular to the core 1607. Instead, this profile now comprises a partial outline of the third and fourth holes 1606, 1608, these holes forming respective re-entrant features for the cladding 1603. The cladding 1603 thereby may have a cross-sectional outline in the form of a bow tie profile, as illustrated by FIG. 16.

The liquid etchant may etch the cladding 1603 approximately equally around its circumference during the external etching. The first and second holes 1602, 1604 may be provided radially inwards of the third and fourth holes 1606, 1608, however, and so these may remain enclosed by the cladding 1603 at the point that the third and fourth holes 1606, 1608 may be exposed. At this moment, the liquid etchant may be flushed from the chamber through the outlet 1409 so as to prevent unwanted removal of cladding material either between the third and fourth holes 1606, 1608, or between either of the first and second holes 1602, 1604 and the outside of the cladding 1603. The substantially non-compressible fluid may be introduced into the chamber via the inlet 1408 to help achieve this flushing. The flow of liquid into and out from the chamber via the outlet 1409 is indicated by the vertical arrows in FIG. 14. The chamber may be then sealed by blocking the inlet 1408 and the outlet 1409, as shown by FIG. 15.

The housing 1411 may, therefore, advantageously provide the dual-purpose of providing a container for the liquid etchant and subsequently containing the substantially non-compressible fluid. This improves the simplicity of the method for forming the pressure sensor 1520. Internal etching may occur either during the external etching or afterwards, with either the etchant or the substantially non-compressible fluid which surrounds the optical fiber 1401 being used as a medium to transfer heat from the heating element 1406 to the cladding 1603. In one or more embodiments, no such surrounding fluid may be provided during this stage. After the internal etching, the ends of the optical fiber 1401 which trail from the apertures of the housing 1411 may be spliced onto respective single-mode optical fibers 1518, 1519, as before. Advantageously, unlike the portion of the optical fiber 1401 which may have been subject to external etching, these ends have a circular profile that corresponds to the profile of the single-mode optical fibers 1518, 1519. These ends may, therefore, be practically easier to splice together whilst maintaining a good optical coupling. The completed pressure sensor 1520 having single-mode optical fibers 1518, 1519 spliced onto either end of the birefringent optical fiber 1401 may be shown by FIG. 14. Notably, the heating element 1406 may be removed at this stage since it may be no longer required.

Figure 17:
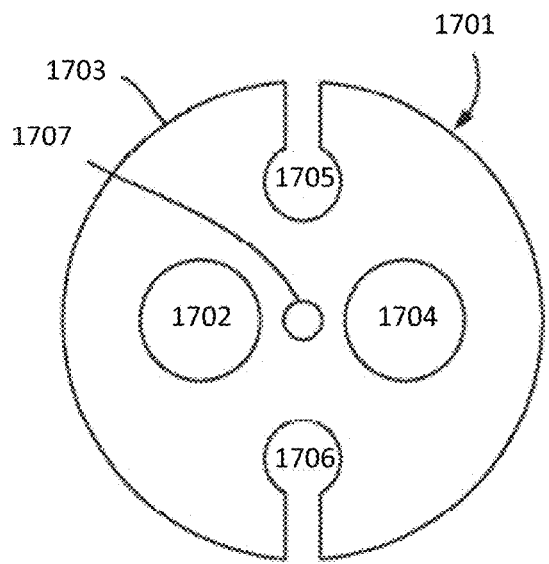
FIG. 17 is a cross-sectional end view of an optical fiber after internal and external etching.

A cross-sectional end view of an optical fiber 1701 in accordance with one or more embodiments is illustrated by FIG. 17. In FIG. 17, an external etching may have been performed using laser ablation rather than by immersing the optical fiber in a liquid etchant. The housing (not shown) may, therefore, comprise a window for enabling a laser beam to be directed onto the cladding 1703 from a position outside of the housing. The laser beam may be directed onto opposing sides of the cladding 1703 and then moved along the axis of the optical fiber 1701 so as to expose the third and fourth holes 1705, 1706 across a region encompassing the FBG (not shown). Unlike the third embodiment, the external etching does not occur equally around the outside of the cladding 1703 and so there may be less danger of accidentally exposing the first or second holes 1702, 1704. The first and second holes 1702, 1704 may, therefore, be formed larger than in other embodiments, which can lead to further increases in the birefringence within the core 1707.

Optionally, the same light source may be used to perform two or more of: writing the FBG onto the core 1707, heating the cladding 1703 during internal etching, ablating the cladding 1703 during external etching, and transmitting a pulse of light along the core 1707 during subsequent pressure monitoring.

One or more embodiments of a pressure sensor may now be discussed with reference to FIGS. 18 and 19. The optical fiber 1801 may be internally etched within the housing of the pressure sensor (not shown). No external etching may be performed.

Figure 18:
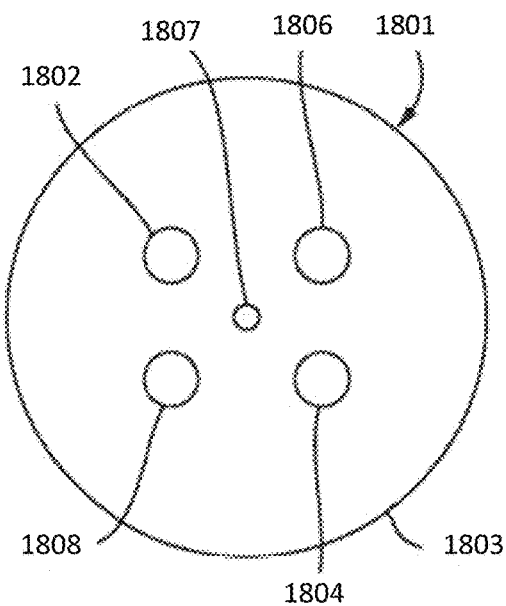
FIG. 18 is a cross-sectional end view of an optical fiber before internal etching.

Two pairs of parallel holes may be initially drilled into the cladding of a pre-form which may be then drawn so as to form the optical fiber 1801 having a cross-sectional outline shown by FIG. 18. Optical fiber 1801 may have a birefringence structure comprising a first hole 1802, second hole 1804, third hole 1806, and fourth hole 1808, each enclosed within cladding 1801 and rotationally dispersed about a central core 1807. The holes 1802, 1804, 1806, 1808 have approximately the same diameter and may be arranged at the same radial distance from the core 1807. The birefringence structure may be arranged such that, when viewed in a plane having a normal parallel to the core 1807, an acute angle may be made between the first and fourth holes 1802, 1808 relative to the core 1807, and an acute angle may be made between the second and third holes 1804, 1806 relative to the core 1807. An obtuse angle may be, therefore, formed between the first and third holes 1802, 1806 relative to the core 1807, and between the second and fourth holes 1804, 1808 relative to the core 1807.

An optical sensor may be formed on the core 1807. A portion of the optical fiber 1801 comprising the optical sensor may be positioned within a chamber having a pressure transfer element, and the chamber may be then filled with an inert fluid (as before). A heating element may be provided so as to heat the portion of the optical fiber 1801 within the chamber via the surrounding fluid. An internal etching process may be then performed during which a liquid etchant may be flowed through each of the first, second, third and fourth holes 1802, 1804, 1806, 1808 so as to remove a portion of the surrounding cladding 1803. A higher etching rate occurs along the heated portion of the optical fiber 1801 (as occurred in the second embodiment). The diameter of each of these holes 1802, 1804, 1806, 1808 may be thereby enlarged until the first hole 1802 coalesces with the fourth hole 1808, and the second hole 1804, coalesces with the third hole 1806, each along the heated portion. Care may be taken not to merge any portions of the holes that extend outside of the chamber (where the birefringence structure may be comparatively weak). At this point, the etchant may be flushed from the holes 1802, 1804, 1806, 1808 so as to prevent the first and third, or second and fourth holes from merging, and to prevent any of the holes 1802, 1804, 1806, 1808 from coming into contact with the core 1807.

Figure 19:
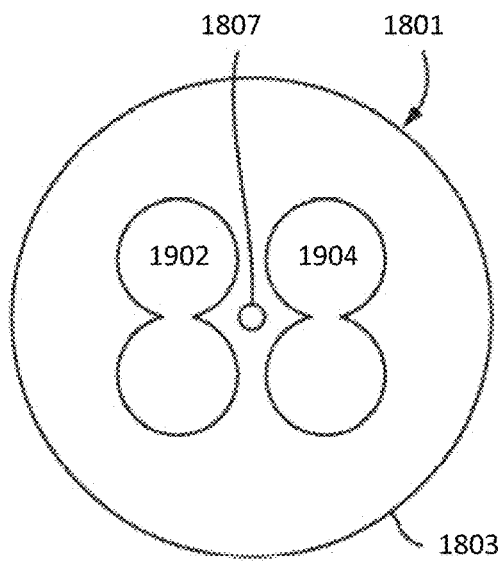
FIG. 19 is a cross-sectional end view of an optical fiber after internal etching.

A cross-sectional view of the resulting structure may be shown by FIG. 19. As can be seen, the internal etching process results in the formation of a first etched hole 1902 and a second etched hole 1904. These holes 1902, 1904 may be non-circular and approximately dumbbell shaped when viewed in the cross-sectional plane having a normal parallel to the core 1807. This dumbbell shape may equivalently be described as "peanut shaped" or generally ovoid comprising two opposing re-entrant portions positioned midway along the major axis.

The core 1807 may be positioned midway between the center of the etched holes 1902, 1904. The thickness of cladding 1803 separating the core 1807 from the outside of the optical fiber 1801, therefore, varies significantly about the rotational axis of the core 1807. This thickness may be relatively high for the sectors not encompassing the first or second etched holes 1902, 1904 and relatively low for the sectors encompassing the first or second etched holes 1902, 1904. Isotropic forces applied to the outside of the encased portion of optical fiber 1801 may be, therefore, converted into anisotropic stress on the core 1807 with a high level of asymmetry (without the need for external etching). This can lead to relatively large changes in the birefringence of the optical sensor and so the formation of a pressure sensor having a particularly high sensitivity.

In one or more embodiments, dumbbell-shaped holes may be formed along the encased portion of optical fiber without flowing an etchant along the third and fourth holes. For example, the etchant may be flowed through the first and second holes only until these holes combine with the fourth and third holes, respectively.

In one or more embodiments, one or more additional holes (in addition to the four disclosed herein) may be provided within the cladding. These holes may extend parallel to the core and remain enclosed within the cladding after any internal and external etching processes. Desirable levels of birefringence may hence be induced according to these techniques.

In a further embodiment, the core may be pre-formed so as to exhibit birefringence. For example, an elliptical core could be used. The birefringence structure may also comprise stress rods. The rods may be inserted into holes drilled in the preform to form a "PANDA" fiber. Doped regions may be provided outside the core to induce anisotropic stress in the core. For example, the preform may comprise regions of the cladding formed of highly-doped silica glass that may have a different coefficient of thermal expansion (CTE) from the surrounding cladding. When the fiber cools from the drawing process, this difference in CTE may cause different parts of the fiber to contract by different amounts, thereby creating stress-induced birefringence in the core. This forms a "BOWTIE" fiber. The birefringence may be then modulated in response to changes in pressure supplied by the substantially non-compressible fluid by the birefringence structure.

The above techniques may be used in any combination with the other embodiments disclosed. The system may have a low-mass and does not require protection from electromagnetic interference. Furthermore, the pressure sensors may be non-intrusive. As may be appreciated, a pressure sensor may be, therefore, provided which offers improved sensitivity over the prior art. This pressure sensor may be relatively simple and, therefore, inexpensive to construct. Furthermore, the pressure sensor may be constructed so as to be physically smaller than some prior art sensors. It may also be used as part of a system for monitoring pressure that may be resistant to high pressure and temperature environments and requires no additional electrical cabling that could provide potential leak points within high pressure environments.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof. In particular, with regards to the methods disclosed, one or more steps may not be required in all embodiments of the methods and the steps disclosed in the methods may be performed in a different order than was described.

What is claimed is:

1. A method for optimizing a fracturing treatment, the method comprising:
    measuring one or more of interwell fluid interaction data, microdeformation strain data, microseismic data, distributed temperature data, distributed acoustic data, and distributed strain data from a subsurface formation using one or more optical fibers;
    analyzing the one or more of interwell fluid interaction data, microdeformation strain data, microseismic data, distributed temperature data, distributed acoustic data, and distributed strain data;
    modifying a fracture network model based, at least in part, on the analyzing the one or more of interwell fluid interaction data, microdeformation strain data, microseismic data, distributed temperature data, distributed acoustic data, and distributed strain data; and
    modifying one or more fracturing treatment optimization actions based, at least in part, on the fracture network model.

2. The method of claim 1, wherein modifying the one or more fracturing treatment optimization actions based, at least in part, on the fracture network model comprises one or more of modifying fluid flow rates, including, for example, increasing and decreasing fluid flow rates, introducing periodic oscillations in the fluid flow rates, removing periodic oscillations in the fluid flow rates, and modifying the rates of the periodic oscillations in the fluid flow rates.

3. The method of claim 1, wherein one or more fiber optic cables comprise the one or more optical fibers.

4. The method of claim 1, wherein the one or more optical fibers comprise one or more Fiber Bragg Gratings.

5. The method of claim 4, further comprising using one or more of time-division multiplexing and wavelength-division multiplexing to collect the one or more of interwell fluid interaction data, microdeformation strain data, microseismic data, distributed temperature data, distributed acoustic data, and distributed strain data from the one or more optical fibers, and wherein the one or more Fiber Bragg Gratings are inscribed at one or more different wavelengths.

6. The method of claim 4, wherein the one or more Fiber Bragg Gratings exhibit birefringence proportional to the hydrostatic pressure applied to the one or more optical fibers.

7. The method of claim 1, further comprising collecting well treatment data and modifying the fracture network model based, at least in part, on the well treatment data.

8. The method of claim 1, further comprising calculating one or more interwell fluid interaction effects and modifying the fracture network model based, at least in part, on the one or more interwell fluid interaction effects.

9. The method of claim 1, wherein modifying the one or more fracturing treatment optimization actions comprises modifying one or more parameters associated with treatment of one or more of a treatment well and a monitoring well.

10. A non-transitory computer readable medium for storing one or more instructions that, when executed, causes a processor to:
    collect one or more of interwell fluid interaction data, microdeformation strain data, microseismic data, distributed temperature data, distributed acoustic data, and distributed strain data from one or more sensors measuring a subsurface formation using one or more optical fibers;
    analyze the one or more of interwell fluid interaction data, microdeformation strain data, microseismic data, distributed temperature data, distributed acoustic data, and distributed strain data;
    modify a fracture network model based, at least in part, on the analyzing the one or more of interwell fluid interaction data, microdeformation strain data, microseismic data, distributed temperature data, distributed acoustic data, and distributed strain data; and
    modify one or more fracturing treatment optimization actions based, at least in part, on the fracture network model.

11. The non-transitory computer readable medium of claim 10, wherein modifying the one or more fracturing treatment optimization actions based, at least in part, on the fracture network model comprises one or more of modifying fluid flow rates, including, for example, increasing and decreasing fluid flow rates, introducing periodic oscillations in the fluid flow rates, removing periodic oscillations in the fluid flow rates, and modifying the rates of the periodic oscillations in the fluid flow rates.

12. The non-transitory computer readable medium of claim 10, wherein one or more fiber optic cables comprise the one or more optical fibers, and wherein the one or more optical fibers comprise one or more Fiber Bragg Gratings that are inscribed at one or more different wavelengths.

13. The non-transitory computer readable medium of claim 12, wherein the one or more Fiber Bragg Gratings exhibit birefringence proportional to the hydrostatic pressure applied to the one or more optical fibers.

14. The non-transitory computer readable medium of claim 10, wherein the one or more instructions, when executed, further causes the processor to:
  calculate one or more interwell fluid interaction effects based, at least in part, on the one or more of interwell fluid interaction data, microdeformation strain data, microseismic data, distributed temperature data, distributed acoustic data, and distributed strain data, and
  modify one or more parameters associated with treatment of one or more of a treatment well and a monitoring well based, at least in part, on the one or more interwell fluid interaction effects.

15. The non-transitory computer readable medium of claim 10, wherein the one or more instructions, when executed, further causes the processor to:
  collect well treatment data; and
  modify the one or more parameters associated with treatment of one or more of a treatment well and a monitoring well based, at least in part, on the well treatment data.

16. The non-transitory computer readable medium of claim 10, wherein the modifying one or more fracturing treatment optimization actions further comprises modifying one or more parameters associated with treatment of one or more of a treatment well and a monitoring well.

17. A method for optimizing a fracturing treatment, the method comprising:
  using a fiber optic cable in a subsurface formation to measure one or more of interwell fluid interaction data, microdeformation strain data, microseismic data, distributed temperature data, distributed acoustic data, and distributed strain data;
  analyzing the one or more of interwell fluid interaction data, microdeformation strain data, microseismic data, distributed temperature data, distributed acoustic data, and distributed strain data;
  modifying a fracture network model based, at least in part, on the analyzing the one or more of interwell fluid interaction data, microdeformation strain data, microseismic data, distributed temperature data, distributed acoustic data, and distributed strain data; and
  modifying one or more fracturing treatment optimization actions based, at least in part, on the modified fracture network model.

18. The method of claim 17, wherein the fiber optic cable comprises one or more optical fibers, and wherein the one or more optical fibers comprise one or more Fiber Bragg Gratings.

19. The method of claim 18, further comprising using one or more of time-division multiplexing and wavelength-division multiplexing to collect the one or more of interwell fluid interaction data, microdeformation strain data, microseismic data, distributed temperature data, distributed acoustic data, and distributed strain data from the fiber optic cable, and wherein the one or more Fiber Bragg Gratings are inscribed at one or more different wavelengths.

20. The method of claim 17, further comprising collecting well treatment data and modifying the fracture network model based, at least in part, on the well treatment data, and modifying the one or more fracturing treatment optimization actions based, at least in part, on the modified fracture network model further comprises modifying one or more of parameters associated with treating one or more of a treatment well and a monitoring well.

* * * * *